United States Patent
Jain et al.

(10) Patent No.: US 11,469,821 B2
(45) Date of Patent: *Oct. 11, 2022

(54) INTERFERENCE CANCELLATION METHODS AND APPARATUS

(71) Applicant: GenXComm, Inc., Austin, TX (US)

(72) Inventors: Hardik Jain, Austin, TX (US); Sriram Vishwanath, Austin, TX (US)

(73) Assignee: GenXComm, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,308

(22) Filed: Jun. 7, 2021

(65) Prior Publication Data
US 2021/0297156 A1 Sep. 23, 2021

Related U.S. Application Data

(63) Continuation of application No. 16/132,801, filed on Sep. 17, 2018, now Pat. No. 11,032,005, which is a
(Continued)

(51) Int. Cl.
*H04B 10/2575* (2013.01)
*H04B 10/90* (2013.01)
*H04B 10/69* (2013.01)

(52) U.S. Cl.
CPC ... *H04B 10/25752* (2013.01); *H04B 10/6972* (2013.01); *H04B 10/90* (2013.01); *H04B 2210/006* (2013.01); *H04B 2215/068* (2013.01)

(58) Field of Classification Search
CPC .............................................. H04B 10/25752
See application file for complete search history.

(56) References Cited

U.S. PATENT DOCUMENTS

| 4,608,569 A | 8/1986 | Dickey, Jr. et al. |
| 5,377,289 A | 12/1994 | Johnson |

(Continued)

FOREIGN PATENT DOCUMENTS

| CN | 101379718 | 3/2009 |
| CN | 104484852 | 4/2015 |

(Continued)

OTHER PUBLICATIONS

Chang et al., "Full-duplex spectrum sensing in cognitive radios using optical self-interference cancellation," 2015 9th International Conference on Sensing Technology (ICST), IEEE, pp. 341-344, Dec. 8, 2015.

(Continued)

*Primary Examiner* — Nathan M Cors
(74) *Attorney, Agent, or Firm* — Brownstein Hyatt Farber Schreck, LLP

(57) ABSTRACT

Methods and apparatus for interference cancelation in a radio frequency communications device are described. In various embodiments a signal to be transmitted in converted into an optical signal and processed using an optical filter assembly including one or more optical filters to generate an optical interference cancelation signal. The optical interference cancelation signal is converted into an analog radio frequency interference cancelation signal using an optical to electrical converter prior to the analog radio frequency interference cancelation signal being combined with a received signal to cancel interference, e.g., self interference. The optical filter assembly can include a large number of taps, e.g., 30, 50, 100 or more. Each tap may be implemented as a separate optical filter or series of optical filters. Delays and/or gain of the optical filters can be controlled dynamically based on channel estimates which may change due to (Continued)

changes in the environment and/or communications device position.

19 Claims, 12 Drawing Sheets

Related U.S. Application Data continuation of application No. 15/377,902, filed on Dec. 13, 2016, now Pat. No. 10,110,306.

(60) Provisional application No. 62/266,701, filed on Dec. 13, 2015.

(56) References Cited

U.S. PATENT DOCUMENTS

| | | | |
|---|---|---|---|
| 5,444,864 A | 8/1995 | Smith | |
| 5,578,845 A | 11/1996 | Yoshiyuki et al. | |
| 5,699,176 A | 12/1997 | Cohen | |
| 5,701,371 A | 12/1997 | Ishida | |
| RE35,736 E | 2/1998 | Powell | |
| 5,757,312 A | 5/1998 | Szmurlo | |
| 5,867,293 A | 2/1999 | Kotten | |
| 5,904,546 A | 5/1999 | Wood et al. | |
| 6,359,714 B1 | 3/2002 | Imajo | |
| 6,373,909 B2 | 4/2002 | Lindquist | |
| 6,507,728 B1 | 1/2003 | Watanabe | |
| 6,539,204 B1 | 3/2003 | Marsh | |
| 6,567,648 B1 | 5/2003 | Ahn | |
| 6,567,649 B2 | 5/2003 | Souissi | |
| 6,745,018 B1 | 6/2004 | Zehavi | |
| 6,751,447 B1 | 6/2004 | Jin | |
| 6,760,454 B1 | 7/2004 | Shreve | |
| 6,771,931 B2 | 8/2004 | Waltho | |
| 6,778,319 B2 | 8/2004 | Chavez-Pirson | |
| 6,873,639 B2 | 3/2005 | Zhang | |
| 6,907,093 B2 | 6/2005 | Blount | |
| 6,999,639 B2 | 2/2006 | Tsarev | |
| 7,020,396 B2 | 3/2006 | Izadpanah | |
| 7,058,368 B2 | 6/2006 | Nicholls | |
| 7,064,697 B2 | 6/2006 | Taylor et al. | |
| 7,085,497 B2 | 8/2006 | Tiemann | |
| 7,116,484 B2 | 10/2006 | Nemoto | |
| 7,123,676 B2 | 10/2006 | Gebara | |
| 7,130,289 B2 | 10/2006 | Kuan et al. | |
| 7,355,993 B2 | 4/2008 | Adkins | |
| 7,366,244 B2 | 4/2008 | Gebara | |
| 7,446,601 B2 | 11/2008 | LeChevalier | |
| 7,496,257 B2 | 2/2009 | Levner | |
| 7,509,054 B2 | 3/2009 | Calabro et al. | |
| 7,566,634 B2 | 7/2009 | Beyne et al. | |
| 7,650,080 B2 | 1/2010 | Yap | |
| 7,660,531 B2 | 2/2010 | Lee | |
| 7,672,643 B2 | 3/2010 | Loh | |
| 7,680,368 B2 | 3/2010 | Welch et al. | |
| 7,711,329 B2 | 5/2010 | Aparin | |
| 7,720,029 B2 | 5/2010 | Orava | |
| 7,729,431 B2 | 6/2010 | Gebara | |
| 7,756,480 B2 | 7/2010 | Loh | |
| 7,778,611 B2 | 8/2010 | Asai | |
| 7,809,047 B2 | 10/2010 | Kummetz | |
| 7,826,808 B2 | 11/2010 | Faulkner | |
| 7,853,195 B2 | 12/2010 | Higgins | |
| 7,869,527 B2 | 1/2011 | Vetter | |
| 7,876,867 B2 | 1/2011 | Filipovic | |
| 7,907,895 B2 | 3/2011 | Shinagawa | |
| 7,917,177 B2 | 3/2011 | Bauman | |
| 8,036,606 B2 | 10/2011 | Kenington | |
| 8,055,235 B1 | 11/2011 | Gupta et al. | |
| 8,078,130 B2 | 12/2011 | Fudge | |
| 8,081,946 B2 | 12/2011 | Fudge | |
| 8,098,779 B2 | 1/2012 | Komninakis et al. | |
| 8,155,605 B2 | 4/2012 | Hwang | |
| 8,170,487 B2 | 5/2012 | Sahota et al. | |
| 8,233,872 B2 | 7/2012 | Nagai | |
| 8,249,540 B1 | 8/2012 | Gupta | |
| 8,270,843 B2 | 9/2012 | Nakamoto | |
| 8,299,555 B2 | 10/2012 | Su et al. | |
| 8,320,504 B2 | 11/2012 | Peng | |
| 8,331,509 B2 | 12/2012 | Wang | |
| 8,351,874 B2 | 1/2013 | Dent | |
| 8,477,871 B2 | 7/2013 | Neumann | |
| 8,521,090 B2 | 8/2013 | Kim | |
| 8,526,903 B2 | 9/2013 | Gudem | |
| 8,565,681 B2 | 10/2013 | Kim | |
| 8,600,200 B1 | 12/2013 | Rakich et al. | |
| 8,618,966 B2 | 12/2013 | Kanter | |
| 8,682,170 B2 | 3/2014 | Prucnal | |
| 8,693,810 B2 | 4/2014 | Suarez et al. | |
| 8,730,786 B2 | 5/2014 | Wang | |
| 8,781,030 B2 | 7/2014 | Peng | |
| 8,785,332 B2 | 7/2014 | Johnson et al. | |
| 8,805,298 B2 | 8/2014 | McCallister | |
| 8,845,854 B2 | 9/2014 | Lei et al. | |
| 8,867,928 B2 | 10/2014 | Piehler | |
| 8,872,583 B2 | 10/2014 | Lee | |
| 8,971,712 B2 | 3/2015 | Fan et al. | |
| 8,977,223 B1 | 3/2015 | Gupta | |
| 9,020,307 B2 | 4/2015 | Ishikawa | |
| 9,077,440 B2 | 7/2015 | Wyville | |
| 9,100,099 B2 | 8/2015 | Loh | |
| 9,106,453 B2 | 8/2015 | Wang | |
| 9,160,386 B2 | 10/2015 | Rimini | |
| 9,178,635 B2 | 11/2015 | Ben-Shlomo | |
| 9,184,902 B2 | 11/2015 | Khojastepour | |
| 9,195,052 B2 | 11/2015 | Long | |
| 9,214,718 B2 | 12/2015 | Mow | |
| 9,224,650 B2 | 12/2015 | Lei et al. | |
| 9,252,857 B2 | 2/2016 | Negus | |
| 9,253,003 B1 | 2/2016 | Harel | |
| 9,257,811 B2 | 2/2016 | Gao | |
| 9,258,052 B2 | 2/2016 | George | |
| 9,268,092 B1 | 2/2016 | Jarecki, Jr. | |
| 9,312,895 B1 | 4/2016 | Gupta | |
| 9,344,125 B2 | 5/2016 | Kpodzo | |
| 9,344,139 B2 | 5/2016 | Sjoland | |
| 9,385,268 B2 | 7/2016 | Minamiru et al. | |
| 9,391,667 B2 | 7/2016 | Sundstrom | |
| 9,438,288 B2 | 9/2016 | Feld | |
| 9,450,623 B2 | 9/2016 | Weissman | |
| 9,490,963 B2 | 11/2016 | Choi | |
| 9,520,983 B2 | 12/2016 | Choi et al. | |
| 9,520,985 B2 | 12/2016 | Choi | |
| 9,571,205 B1* | 2/2017 | Suarez | H04B 1/525 |
| 9,589,812 B2 | 3/2017 | Takahashi et al. | |
| 9,602,149 B1 | 3/2017 | Tanzi | |
| 9,608,718 B2 | 3/2017 | Monsen | |
| 9,651,652 B2 | 5/2017 | Kpodzo et al. | |
| 9,667,404 B2 | 5/2017 | Sjoland | |
| 9,696,492 B1 | 7/2017 | Cox | |
| 9,698,913 B2 | 7/2017 | Foster | |
| 9,703,056 B2 | 7/2017 | Neelakantan et al. | |
| 9,712,233 B1* | 7/2017 | Deng | H04B 10/00 |
| 9,722,713 B2 | 8/2017 | Tanzi | |
| 9,723,612 B2 | 8/2017 | Stapleton | |
| 9,726,821 B2 | 8/2017 | Murray et al. | |
| 9,735,056 B2 | 8/2017 | Takahashi et al. | |
| 9,748,906 B2 | 8/2017 | Stewart | |
| 9,768,852 B2 | 9/2017 | Ling | |
| 9,774,364 B2 | 9/2017 | Shih | |
| 9,775,123 B2 | 9/2017 | Harel | |
| 9,793,943 B2 | 10/2017 | Sjoland | |
| 9,793,992 B2 | 10/2017 | Hino | |
| 9,807,700 B2 | 10/2017 | Harel | |
| 9,831,898 B2 | 11/2017 | Pratt | |
| 9,847,258 B2 | 12/2017 | Rohleder et al. | |
| 9,871,552 B2 | 1/2018 | Din | |
| 9,885,806 B2 | 2/2018 | Steinhardt | |
| 9,885,825 B2 | 2/2018 | Kopp | |
| 9,887,862 B2 | 2/2018 | Zhou et al. | |
| 9,900,044 B2 | 2/2018 | Sjoland | |
| 9,923,593 B2 | 3/2018 | Andersson | |
| 9,923,708 B2 | 3/2018 | Khandani | |

(56) References Cited

U.S. PATENT DOCUMENTS

| | | |
|---|---|---|
| 9,948,377 B1 | 4/2018 | Kim et al. |
| 9,960,805 B2 | 5/2018 | Wyville |
| 9,960,850 B2 | 5/2018 | Daniel |
| 9,967,014 B1 | 5/2018 | Park et al. |
| 9,973,282 B2 | 5/2018 | Welch |
| 9,997,363 B2 | 6/2018 | Ono et al. |
| 10,009,120 B2 | 6/2018 | Ranson |
| 10,027,465 B2 | 7/2018 | Sjoland |
| 10,031,246 B2 | 7/2018 | Zhou |
| 10,038,471 B2 | 7/2018 | Chang |
| 10,041,028 B2 | 8/2018 | Sim et al. |
| 10,064,217 B2 | 8/2018 | Rajagopal et al. |
| 10,084,506 B2 | 9/2018 | Sjoland |
| 10,110,306 B2 * | 10/2018 | Jain .................. H04B 10/6972 |
| 10,177,836 B2 | 1/2019 | Hong |
| 10,187,158 B2 | 1/2019 | Kikuchi |
| 10,191,217 B2 | 1/2019 | Boutami |
| 10,257,746 B2 | 4/2019 | Jain et al. |
| 10,284,367 B1 | 5/2019 | Le Ngoc |
| 10,321,357 B1 | 6/2019 | Jain et al. |
| 10,325,861 B2 | 6/2019 | Miccoli |
| 10,341,028 B2 | 7/2019 | Kanter |
| 10,356,782 B2 | 7/2019 | Negus |
| 10,367,584 B2 | 7/2019 | Rakich |
| 10,418,775 B2 | 9/2019 | Gao |
| 10,491,313 B2 | 11/2019 | Jain |
| 10,656,350 B2 | 5/2020 | Chen et al. |
| 10,663,663 B2 | 5/2020 | Painchaud |
| 10,673,519 B2 | 6/2020 | Hong |
| 10,727,945 B1 | 7/2020 | Nguyen et al. |
| 10,754,091 B1 | 8/2020 | Nagarajan |
| 10,873,877 B2 | 12/2020 | Jain et al. |
| 11,032,005 B2 | 6/2021 | Vishwanath et al. |
| 11,032,737 B2 | 6/2021 | Jain et al. |
| 2003/0161637 A1 | 8/2003 | Yamamoto |
| 2004/0151238 A1 | 8/2004 | Masenten |
| 2004/0264610 A1 | 12/2004 | Marro |
| 2011/0065408 A1 | 3/2011 | Kenington |
| 2011/0065409 A1 | 3/2011 | Kenington |
| 2011/0134810 A1 | 6/2011 | Yamamoto et al. |
| 2012/0294608 A1 * | 11/2012 | Prucnal .................. H04K 3/228 398/39 |
| 2013/0295980 A1 | 11/2013 | Reuven |
| 2013/0308732 A1 * | 11/2013 | Kpodzo .................. H04L 43/16 375/346 |
| 2014/0169236 A1 | 6/2014 | Choi |
| 2014/0177660 A1 | 6/2014 | Elmaanaoui |
| 2016/0103341 A1 | 4/2016 | Long |
| 2017/0176780 A1 | 6/2017 | Levy et al. |
| 2018/0006795 A1 | 1/2018 | Raaf |
| 2018/0248627 A1 | 8/2018 | Daniel |
| 2020/0209476 A1 | 7/2020 | Mattis et al. |
| 2020/0304253 A1 | 9/2020 | Choi et al. |
| 2021/0036779 A1 | 2/2021 | Nguyen et al. |
| 2021/0088724 A1 | 3/2021 | Liu et al. |
| 2021/0126669 A1 | 4/2021 | Roberts et al. |
| 2021/0153073 A1 | 5/2021 | Hain et al. |
| 2021/0336050 A1 | 10/2021 | Mattis et al. |
| 2022/0043211 A1 | 2/2022 | Mattis et al. |

FOREIGN PATENT DOCUMENTS

| | | |
|---|---|---|
| EP | 3561561 | 10/2019 |
| GB | 2139374 | 11/1984 |
| JP | 2002214461 | 7/2002 |
| JP | 2004048200 | 2/2004 |
| JP | 2006301415 | 11/2006 |
| JP | A 2011120120 | 6/2011 |
| JP | A 2013110510 | 6/2013 |
| RU | 2474056 | 1/2013 |
| WO | WO 06/072086 | 7/2006 |
| WO | WO 07/092767 | 8/2007 |
| WO | WO 08/036356 | 3/2008 |
| WO | WO 12/112357 | 8/2012 |
| WO | WO 16/118079 | 7/2016 |

OTHER PUBLICATIONS

IBM, "Silicon Nanophotonic Packaging," https://researcher.watson.ibm.com/researcher/view_group_subpage.php?id=5522, Jul. 2016.

Li et al., "Multimode silicon photonics," Nanophotonics, vol. 8, No. 2, pp. 227-247, May 16, 2019.

Mothe et al., "Multichannel Microwave Photonics Signals Summation Device," IEEE *Photonics Technology Letters*, vol. 3, No. 3, pp. 140-142, Feb. 1, 2011.

Velha et al., "Simultaneous data transmissions on engineered closely packed silicon-on-insulator waveguide arrays," 19th International Conference on Transparent Optical Networks (ICTON), IEEE, pp. 1-4, Jul. 2, 2017.

Tang et al., "System limitations due to channel cross-coupling in a highly parallel polymer-based single-mode channel waveguide array," Advances in Resistive Technology and Processing XVI, vol. 2042, 12 pages, Aug. 16, 1993.

Tartaret-Josniere et al., "Microwave Photonics Summation Device with up to 19 Input Signals in K and Ku Bands," *Journal of Lightwave Technology*, vol. 34, No. 20, pp. 4715-4721, Oct. 15, 2016.

Yoo et al., "Heterogeneous 2D/3D photonic integrated microsystems," *Microsystems & Nanoengineering*, 2, 16030, Aug. 2016.

Mokhtari-Koushyar et al., "Nonlinear Distortions Induced by Coherent Combinations in Microwave Photonic Links," 2019 IEEE, Global Communications Conference, Dec. 9-13, 2019, 6 pages.

Mokhtari-Koushyar et al., "Laser Diode Chirp Requirements in Wideband Analog Photonic Signal Processing," 2020 IEEE, Optical fiber Communications Conference and Exhibition, Mar. 8-12, 2020, 3 pages.

* cited by examiner

INTERFERENCE CANCELLATION METHODS AND APPARATUS

RELATED APPLICATIONS

The present application is a continuation of U.S. patent application Ser. No. 16/132,801, filed Sep. 17, 2018, which is a continuation of U.S. patent application Ser. No. 15/377,902, filed Dec. 13, 2016, now U.S. Pat. No. 10,110,306, which claims the benefit of U.S. Provisional Patent Application No. 62/266,701, filed Dec. 13, 2015, the contents of which are incorporated herein by reference as if fully enclosed herein.

The present application also relates to PCT Patent Application S.N. PCT/US2016/066410 filed on Dec. 13, 2016.

All of the foregoing patent applications are hereby expressly incorporated by reference in their entireties.

FIELD

Various embodiments relate to communications methods and apparatus and, more specifically, to methods and apparatus for interference cancellation in communications devices and/or systems.

BACKGROUND

Self interference is a problem for wireless and other communications devices which attempt to send, e.g., transmit and receive at the same time using electrical or wireless signals. While different frequency bands may be used for sending, e.g., uplink, and receiving, e.g., downlink, some of the signal being transmitted may be received by a receiver of the device interfering with the receipt of signals being received from one or more other devices, Interference from the transmitter to the receiver of a device particularly in the case of a shared transmit and receive antenna or cable, or a transmit and receive antenna in close proximity between the transmitter and receiver which is often the case for antennas on mobile communications devices can create interference problems even when the transmit and receive frequency bands are different.

Attempts at canceling self interference by using one or more electronic circuits and filters implemented as electrical components operating in same frequency range as the signals being received and transmitted, e.g., radio frequency domain, have had limited success.

The generation of an interference cancelation signal using electrical components in the form of filters, etc., e.g., in the radio frequency domain, has several problems associated with it. For one thing the electrical circuit elements used to generate an interference cancelation signal may themselves radiate interference, particularly when dealing with signals in the RF frequency band, as wires and/or other components of a filter implemented as an electrical circuit operate as signal transmitters and receivers. Such additional self interference can be highly undesirable in a communications device which transmits and receives radio signals, e.g, using antennas, or electrical signals, e.g., using a electrical cable interface such as a coax cable, Ethernet cable or other non-optical cable. Another problem with the use of filters that operate in the RF band is that shielding within a small device to prevent the transmission of interference generated by such filters in the small device can be difficult to implement given space constraints.

Electrical filter circuits which may be used to generate an interference cancelation filter also have the disadvantage of being relatively bulky making it difficult to implement a large number of filter taps and/or separate delays in an electrical filter being used to generate an interference cancelation filter. For this reason attempts to generate an interference cancelation signal using electrical components operating in the RF frequency domain are often limited to using filters with very few taps and/or delays. Furthermore attempts to pack large numbers of RF circuits or filter taps in a small space can further complicate the problem of interference from one component leaking to another component via unintended radio frequency interaction between nearby components, e.g., with one component acting as an unintended RF transmitter and another component acting as an unintended RF receiver.

Power issues with splitting an electrical signal are also of concern as is thermal noise with electrical components that may be used to generate an interference cancelation signal using electrical components. If a weak interference signal is to be generated for one or more received signal components or frequencies the thermal noise of the electrical circuits may preclude the generation of a meaningful interference cancelation signal since the thermal noise of the electrical circuits used to generate the interference signal may, in some cases, exceed the expected interference signal to be canceled. Moreover, insertion losses in RF systems with couplers and/or microstrips can be high and should normally be impedance-matched carefully, keeping the resulting capacitance and inductances in mind, making the use of such components increasingly more challenging for higher RF frequencies.

Another problem with implementing filters as electrical circuits in the RF range is that it may be difficult to design or implement electrical circuits with the desired filter characteristics since frequency range of the filters may not be uniform in the desired frequency range that may be required to generate an appropriate interference cancelation signal.

While attempts to determine an appropriate interference cancelation signal in a digital RF domain may be attempted, to generate an accurate analog interference cancelation signal to be combined with a received signal may require digital to analog converters with a very large frequency range and resolution which can be costly and/or difficult to implement.

In view of the above discussion it should be appreciated that there is a need for improved methods and apparatus which can be used for self interference cancelation in which communicate using radio frequency signals. In particular it would be desirable if methods and/or apparatus could be developed which address, overcome or reduce one or more of the above discussed problems associated with generating interference cancelation signals using electrical circuits and/or filters operating in the radio frequency domain and/or require the conversion of a digital interference cancelation signal generated in the RF domain to an analog interference cancelation signal using a high resolution electrical digital to analog signal converter.

SUMMARY

Methods and apparatus are described which involve the use of one or more optical circuits, e.g., optical filters, to generate an analog interference cancelation signal which can be combined with a received analog signal as part of a self interference cancelation operation. The methods and apparatus are well suited for use in a wide range of communications devices which communicate in an RF frequency band. In the present application the RF frequency band is to include frequencies from 0 to 500 GHZ. Optical frequencies are above the 500 GHZ frequency.

The interference techniques are well suited for devices which communicate using antennas as well as those which communicate using RF frequencies over other media such as wire cables. The interference cancelation techniques can be used with wireless communications devices and/or wired communications devices. In the case of wireless communications devices a variety of antenna configurations can be used with the interference cancelation apparatus and methods. For example a single shared antenna may be used for transmitting and receiving signals, separate transmit and receive antennas may be used and/or the communications device may use one or more MIMO (multiple in multiple out) antenna configurations. Wired communications system with which the interference cancelation techniques may be used include Ethernet, coax and/or other wired communications systems where the non-optical conductors, e.g., metal, wire conductors or RF waveguides are used to communicate signals.

Communications devices may be, e.g. mobile devices such as cell phones which may communize wirelessly to other user devices or base stations, fixed devices such as stationary base stations or a wide variety of other types of communications devices which communicate, e.g., send and/or receive, RF signals.

In various embodiments, by using one or more optical filters to generate an interference cancelation signal in the optical domain, and then using an optical to electrical converter to generate an analog RF interference cancelation signal from an optical interference cancelation signal one or more of the problems associated with electrical RF filter circuits can be avoided with regard to generation of an interference cancelation signal.

In various embodiments an analog, or optionally digital, RF signal to be transmitted is converted into an optical signal. The optical signal is then filtered using one or more optical filters of an optical filter assembly. Amplitude and/or gain of one or more optical filters of the optical filter assembly are controlled taking into consideration communications channel conditions. Gain control may result in signal amplification or attenuation depending on the control value, e.g., coefficient, used to control the optical amplifier. Phase of an optical signal may also be controlled, e.g., through the use of an optical amplifier or another element. Different optical filters may and often are controlled to have different delays and/or gains. The optical filter assembly acts as and sometimes is a multi-tap filter. Different taps, e.g., parallel filters, in the optical filter assembly may be, and sometimes are, controlled to have different gains. Since the filters, e.g., taps, of the optical filter assembly are implemented in the optical domain they have several advantages over electrical filters. For example, they can be implemented without concern for radiating RF signals and interference to other components since the optical signals will not be picked up by RF signal components such as regular copper wires. Furthermore, optical filters can be implemented in a relatively small space and at a relatively low cost allowing for the use of optical filter assemblies with a relatively large number of filter taps as compared to electrical filter circuits. For example, in some embodiments the optical filter assembly used to generate an interference cancelation signal includes 20, 50, 60, 100 or even more parallel optical filters working as separate controllable filter taps in a relatively small space, e.g., inside the housing of a cell phone or other mobile communications device.

Since optical filter circuits do not suffer from the same thermal noise issues of electrical filter circuits, the optical filter assembly can be used in at least some embodiments to generate reliable interference cancelation signals with relatively low power at one or more frequencies where the power level might be below that of the thermal noise floor of electrical filter components which might be used in a filter.

The use of optical filters allows for multiple taps with different gains and/or delays to be used and controlled using optical gain and delay control techniques which are easily implemented using known optical techniques and which can allow for rapid changes in filter gain and/or delay values to reflect detected changes in channel conditions.

While numerous different features and examples are described all features need not be used in all embodiments. For example, in some embodiments fixed optical filter weights and delays are used while in other embodiments filter weights and delays are changed dynamically in response to detecting changes in channel conditions. Fixed gain and delay filter embodiments are well suited for static conditions where a device may be stationary and the communications channel does not change significantly over time while dynamic control of optical gains and delays is well suited for dynamic environments where channel conditions between a receiver and transmitter of a device are likely to change, e.g., due to device movement or changes in the environment.

Given that the radio frequency is considerably lower than the optical frequencies used in generating the interference cancelation signals, reliable and generally uniform filter characteristics can be achieved by using optical filters.

In addition to one or more of the above benefits, generation of an interference cancelation signal in the optical domain and then conversion of the analog optical signal to an analog radio interference cancelation signal using an optical to electrical signal converter allows an analog RF interference cancelation signal to be generated without the need for a high resolution and potential expensive electrical digital to analog converter which might be required if a digital RF interference cancelation signal was generated and then needed to be converted to an analog RF interference signal prior to use.

An exemplary implementation allows for full duplex communications through mitigation of the self-interference. A feature of some but not all embodiments, is to reconstruct a negative copy of the interference seen at the receiver through linear and/or non-linear filtering operations performed in an optical domain on a copy of the transmitted signal. This operation is facilitated by the fact that the transceiver has knowledge of the transmit signal at various points in the transmit chain. In some but not all embodiments, channel estimation is used to determine the characteristics of the channel between the transmitter and the receiver and to control one or more optical gains and/or delays based on the channel conditions detected at a given point in time. Thus as the channel changes, the optical filter components can be and sometimes are modified in terms of gains and/or delays as part of generating the interference cancelation signal. While a negative analog version of the interference is generated in some embodiments to facilitate combining with a received signal to cancel interference, in other embodiments a positive version of the interference signal is generated for use as an interference cancelation signal and the signal is subtracted from the received signal to provide interference cancelation.

An exemplary communications device, in accordance with some but not all embodiments, comprises: a radio frequency signal to optical signal converter having a radio frequency input configured to receive a radio frequency signal to be communicated and an optical output for outputting a first optical signal generated from said radio frequency signal to be communicated; an optical filter assembly for filtering said first optical signal; and an optical to radio frequency converter coupled to an output of said optical filter assembly, said optical to radio frequency converter for generating a radio frequency interference cancelation signal from a second optical signal output by said optical filter assembly.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 1:
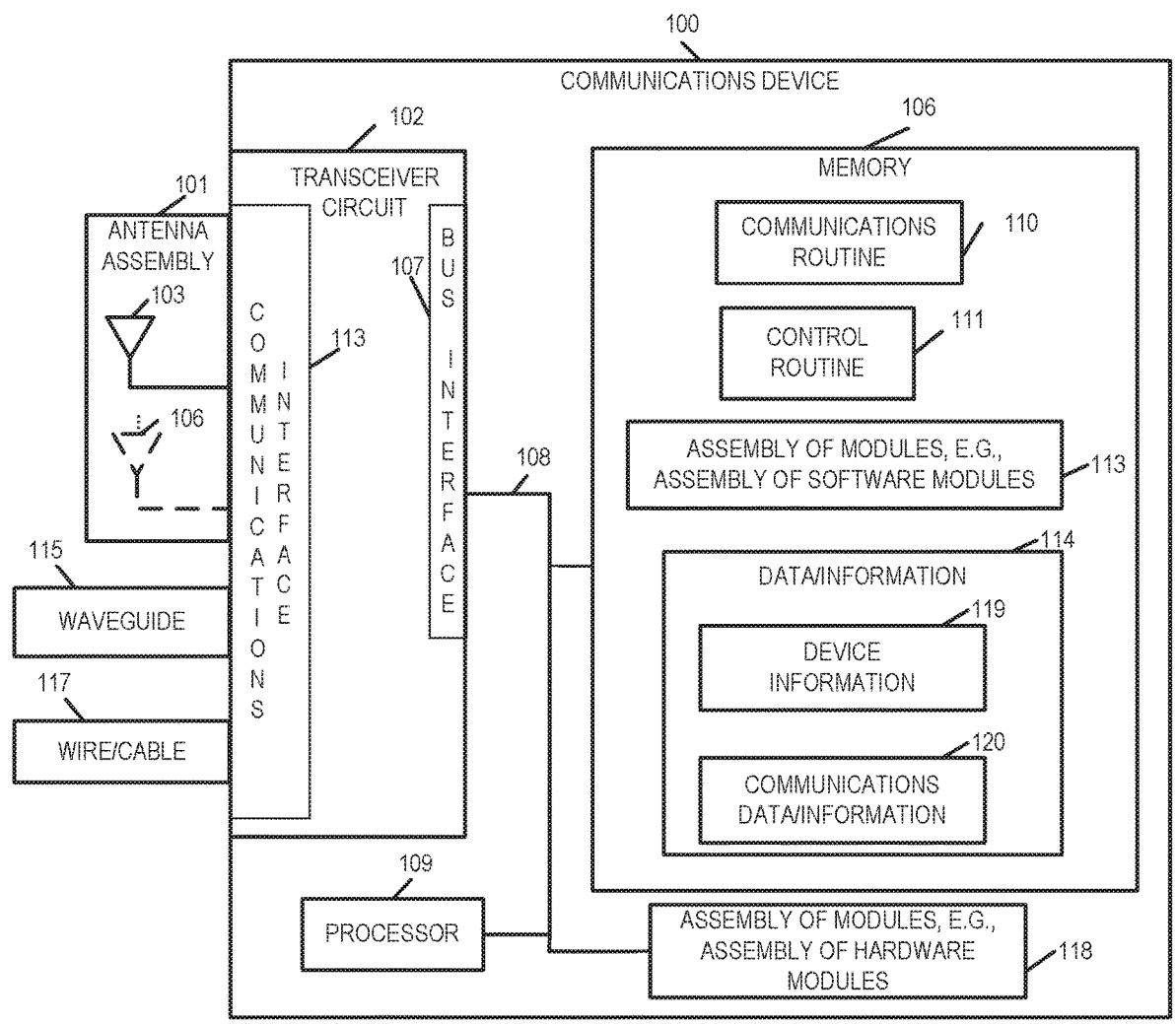
FIG. 1 is a drawing of an exemplary communications device including self-interference cancellation capability, in accordance with an exemplary embodiment.

Methods and apparatus for performing self interference cancellation on radio frequency or other signals are described. While the signals which are transmitted and received are radio frequency signals in at least some embodiments, radio frequency to optical frequency conversion and optical signal processing is used in some embodiments to facilitate generation of a radio frequency signal interference cancelation signal. The use of optical filters allows for a wide range of frequencies to be supported as part of generating the interference cancelation signal with an optical signal being converted to an analog RF signal without the need for generation of a digital RF version of the interference cancelation signal in at least some but not necessarily all embodiments.

Optical filters may be implemented in a cost effective manner allowing for a relatively larger number of optical filters to be used in parallel, e.g., as part of a multi-tap optical filter, in generating the interference cancelation filter. While generation of the interference cancelation signal occurs to a large extent in the optical domain, prior to combining with the received radio frequency signal the optical interference cancelation signal is converted to the radio frequency domain to facilitate interference cancelation in the RF domain.

Thus in various embodiments interference caused to a receiver of a device, by the transmissions of a signal using from the transmitter of the same device, is partially or full achieved by using knowledge of the to transmitted signal, along with multipath delay information to control multiple optical filters, to generate from the transmitted signal an interference cancelation signal which can be combined with a received signals to cancel or reduce the self interference from the received radio frequency signal.

The interference cancelation signal can be a negative copy of the received interference signal to facilitate subtraction from a received signal to reduce the interference to received signal. Alternatively the interference cancelation signal maybe a positive estimate of the received signal which is combined though a negative input of a combining circuit with the received signal to achieve the desired interference cancelation.

In case of full duplex communication, the transmit and receive chains maybe close to each other, e.g., in the same device housing and connected to the same transceiver circuit. The transmit power required to achieve successful communication, e.g., successful receipt of signals from another device is a function the amount of isolation between the transmitter and receiver of a device which can be expressed in terms of the path loss between a device's transmitter and receiver.

For example, in case of wireless local area network communication systems, the transmit power maybe about 200 mW (23 dBm) while the receiver maybe required to have a sensitivity of about −85 dBm when the radios are operating over a bandwidth of 20 MHz. This required transmit power level will affect the minimum possible distance between the transmitter and receiver dependent on the medium and the frequency of the carrier. If the transmitter and receiver are operating at the same time, in some systems the interference from transmitter to receiver maybe as high as 108 dB or more if there is a direct coupling between the transmit and receiver circuit on the transceiver. In such an exemplary embodiment for a true full duplex operation, the receiver may be required to cancel the self interference by 108 dB and reduce the interference below the noise floor of the receiver. Such interference cancelation will then allow for the receiver to decode the desired signal from other nodes.

Attempts to perform self-interference cancellation completely in the radio frequency domain suffer from responsiveness and difficulty in supporting a wide range of frequencies in the RF domain. Attempts at interference in the digital radio frequency domain suffer from limitations due to the dynamic range of the digital-to-analog converter (DAC) and analog-to-digital (ADC) converter used in converting radio frequency digital signals to an analog interference cancelation signal. The effective number of bits of these converters drive the maximum signal-to-noise (SNR) ratio. For example, in case where the interference power is 100 dB higher than the receive noise floor, the digital domain cancellation with 12 effective number of bits at ADC can be limited to about 60 dB. Moreover, the high power interference signal overdrives the receive chain and drives it to its non-linear region and over saturates the ADC. This requires for a multi-stage interference cancellation architecture where there is a need for a RF/analog frontend canceller that reduces the interference signal power to a range where the digital interference cancellation can cancel the remaining interference signal while preserving the desired receive signal. The present invention avoids some of the problems associated with DAC of an RF interference cancelation signal by converting an optical interference cancelation signal into an analog interference cancelation signal. The analog interference cancelation signal generated in such a manner can include a wide range of frequencies allowing for good interference cancelation.

FIG. 1 is a drawing of an exemplary communications device 100 including self-interference cancellation capability in accordance with an exemplary embodiment. Exemplary communications device 100 includes a transceiver circuit 102 a processor 109, e.g., a CPU, a memory 106, and an assembly of modules 118, e.g., assembly of hardware modules, e.g., circuits, coupled together via a bus 108, over which the various elements 102, 109, 106 may communicate data and information. Memory 106 includes a communications routine 110 configured to control communications operations for the communications device 100 including controlling operation of the transceiver circuit 102, a control routine 111, an assembly of modules 113, e.g., an assembly of software modules, and data/information 114.

Data/information includes device information 119, includes interface information including optical filter component information and antenna information, etc., and communications data/information 120 includes, e.g., RF frequency information, channel type information, channel conditions, determined filter coefficients, received signal information, transmitted signal information, generated radio frequency interference cancellation signal information, etc. In some embodiments, some information stored in memory 106 is also stored in local memory within transceiver circuit 102. In some embodiments, processor 102, e.g., a CPU, executes routines including software modules included in memory 106 to control the communications device 100 to implement a method in accordance with the present invention, e.g., control the transceiver circuit 102 to implement a radio frequency interference cancellation method which includes the use of an optical filter assembly. In some embodiments, one or more of steps of the exemplary method are implemented alternatively by one or more hardware modules, e.g., circuits, included in assembly of modules 118.

Transceiver circuit 102 includes a bus interface 107 and a communications interface 113. Bus interface 107 couples the transceiver circuit to bus 108. Communications interface 113 couples the transceiver circuit 102 to one or more or all of: an antenna assembly 101, a waveguide 115 and a wire/cable 117. In some embodiments, the antenna assembly is included as part of the communications device 100. Antenna assembly 101 includes one or more antennas (103, . . . , 106). In some embodiments, antenna assembly 101 includes a single antenna 103 which is used by both the transmitter and receiver of the transceiver circuit 102. In some embodiments, that antenna assembly 101 includes a transmit antenna 103 and a receive antenna 106. In some embodiments, the antenna assembly includes a plurality of transmit antennas and a plurality of receive antennas. In some such embodiments, the antenna assembly 101 and the transceiver circuit 102 support MIMO operations.

Figure 2A:
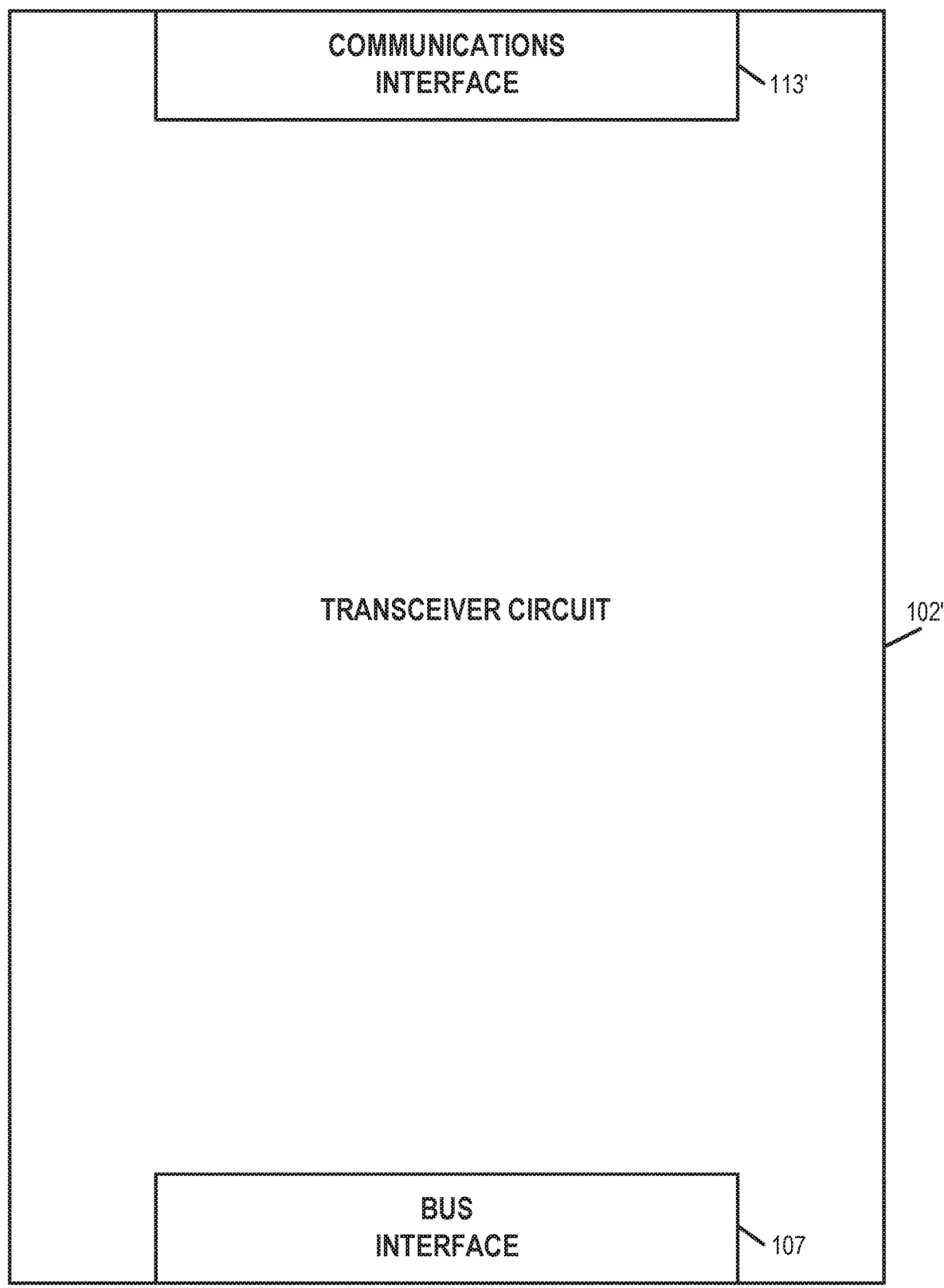
FIG. 2A is a drawing of an exemplary transceiver circuit which may be included in the communications device of FIG. 1, in accordance with an exemplary embodiment.

FIG. 2A illustrates an exemplary transceiver circuit 102' in accordance with an exemplary embodiment. Transceiver circuit 102' includes communications interface 113' and bus interface 107. In some embodiments, transceiver circuit 102' is transceiver circuit 102 of FIG. 1, and communications interface 113' is communications interface 113 of FIG. 1.

Figure 2B:
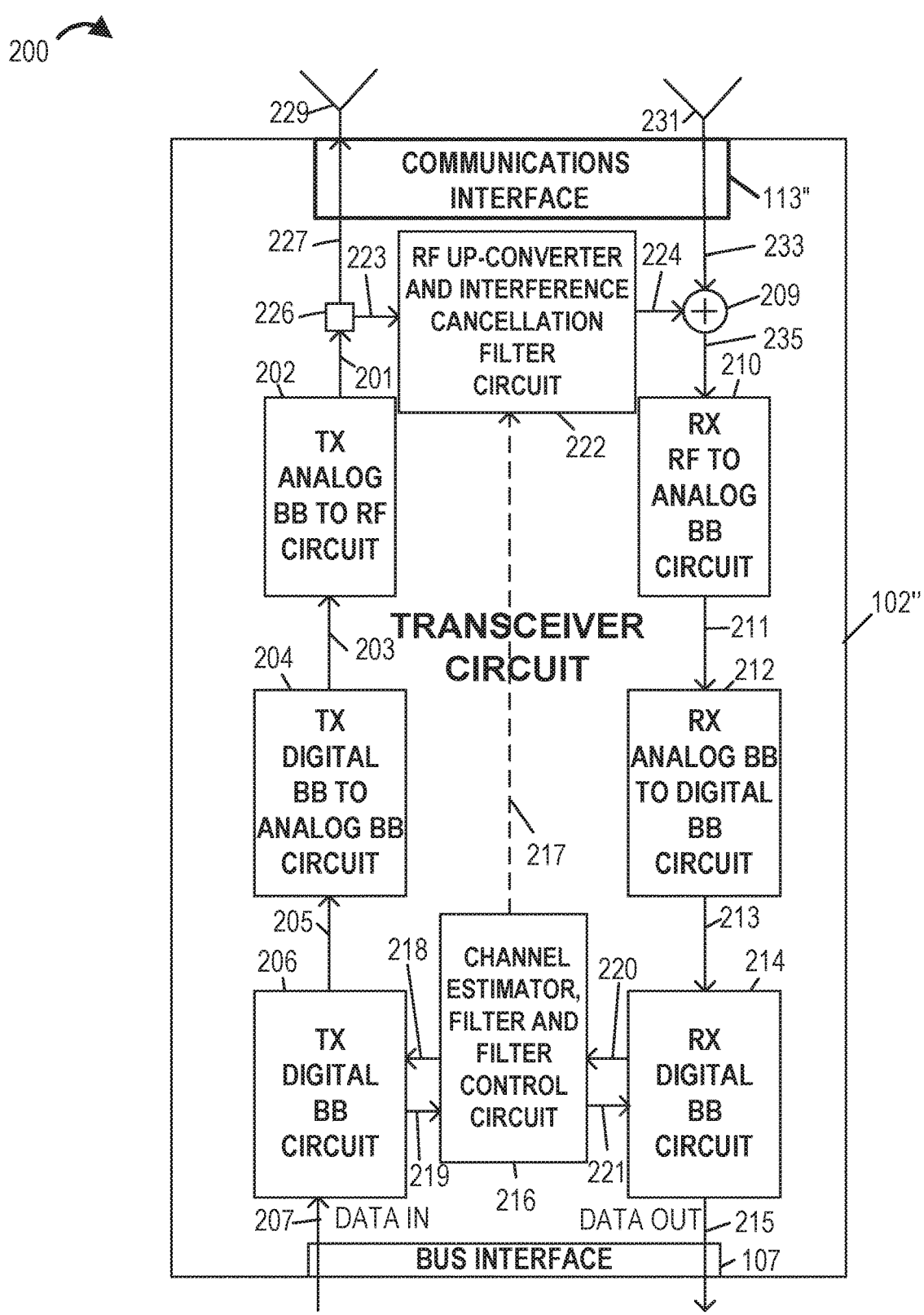
FIG. 2B is a drawing of an exemplary transceiver circuit which includes a communications interface which couples a transmit chain of the transceiver circuit to a transmit antenna and couples a receive chain of the transceiver circuit to a transmit antenna, in accordance with an exemplary embodiment.
Figure 2C:
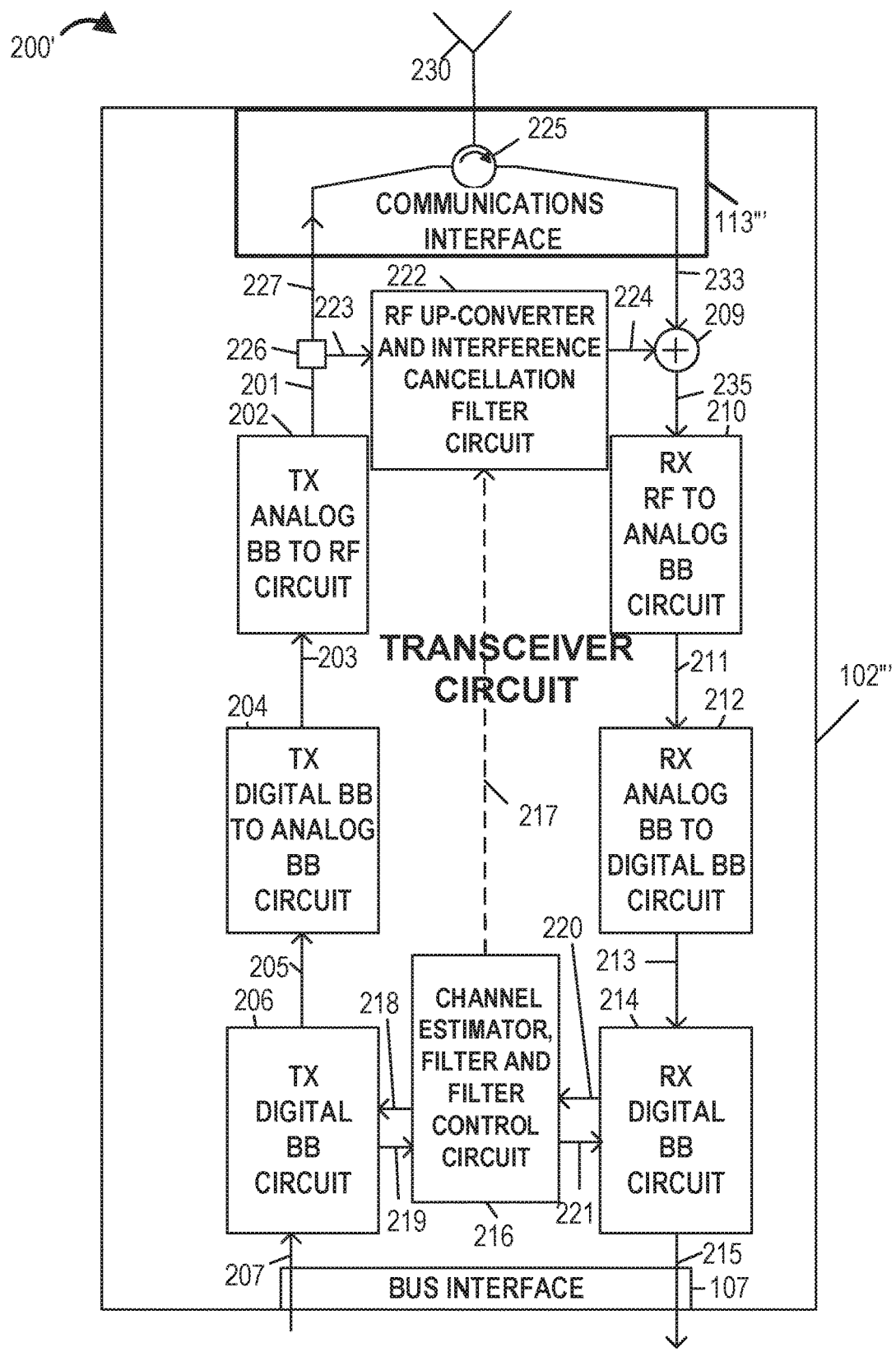
FIG. 2C is a drawing of an exemplary transceiver circuit which includes a communications interface which couples a transmit chain of the transceiver circuit and a receive chain of the transceiver circuit to single antenna, via a circulator included in the interface, in accordance with an exemplary embodiment.

FIG. 2B and FIG. 2C illustrate two exemplary variants of a wireless transceiver architecture that includes one transmit chain and one receiver chain. The realization shown in drawing 200 of FIG. 2B illustrates a two antenna approach where the transmitter chain and the receiver chain use separate antennas 229, 231, respectively. The coupling between transmit and receive is driven by the distance between the antennas, the antenna type and size. In case of the realization shown in drawing 200' in FIG. 2C, the transmit chain and the receive chain use a single antenna 230. The antenna 230 is coupled to the transmit and receive chains using a circulator 225 where the circulator provides some degree of isolation between the transmit signal 227 and receive signal 233. The high power self-interference seen at the receive chain is driven by the isolation provided by the circulator 225 and the reflection from the antenna 230 that leaks back in to the receive chain.

Drawing 200 of FIG. 2B illustrates an exemplary transceiver circuit 102" in accordance with an exemplary embodiment. Transceiver circuit 102" is, e.g., transceiver circuit 102 of FIG. 1 and/or transceiver circuit 102' of FIG. 2. Transceiver circuit 102" includes communications interface 113", bus interface 107, transmit (TX) digital baseband (BB) circuit 206, TX digital BB to analog BB circuit 204, TX analog BB to radio frequency (RF) circuit 202, coupler device 226, signal combiner/coupler device 209, RX RF to analog BB circuit 210, RX analog BB to digital BB circuit 212, RX digital BB circuit 214, RF up-converter and interference cancellation filter circuit 222, and channel estimator, filter, e.g., digital filter, and filter control circuit 216, coupled together as shown in FIG. 2B. Signal combiner 209 is configured to combine a received radio frequency signal 233 with the radio frequency interference cancellation signal 224 to produce a recovered radio frequency signal 235. In various embodiments, the signal combiner 209 is configured to subtract the radio frequency interference signal 233 from the received radio frequency signal 233 to generate the recovered radio frequency signal 235.

A high level overview of the transceiver circuit 102" of FIG. 2B will now be described. The transceiver circuit 102" comprises of a transmit chain and the receive chain. In the transmit chain, the transmit digital baseband circuit 206 receives, via bus interface 107, input data 207 to be transmitted in the form of bits, converts the bits into a digital baseband waveform 205, which is output to the TX digital BB to analog BB circuit 204. The TX digital baseband circuit 206 performs encoding and modulation of the received input data 207. The encoding and modulation performed by TX digital baseband circuit 106 uses, e.g.

orthogonal frequency division multiplexing, CDMA, or another encoding and modulation scheme. The TX digital BB to analog BB circuit 204, e.g., a filter and digital to analog converter (DAC) assembly, converts the digital signal 205 into analog baseband signal 203, which is output to TX analog BB to RF circuit 202. Analog baseband signal 203 is received by TX analog BB to RF circuit 202 and subsequently up-converted to the operating RF frequency using a direct conversion or an intermediate frequency converter included in circuit 202. The up-converted RF signal 2001 is the output of a power amplifier included in circuit 202. The up-converted RF signal 201 is coupled or divided using a device 226 where the pass-through signal 227 goes to the communication interface 113" and the tapped signal 223 is fed to the RF up-converter and interference cancellation filter circuit 222. The RF signal 227 in the communication interface 113" passes through to the antenna 229 in case of this realization.

Receive antenna 231 receives a wireless RF signal and outputs received signal 233 into in to interface 113" toward the receive chain. On the receive side of the transceiver circuit 102", the receive signal 233 from the communication interface 113" feeds in to a coupler or combiner 209 which is 3 port device. Coupler or combiner 209 is responsible for combining input signal 224, which is an output of the RF-up converter and interference cancellation filter circuit 222, and input signal 233, which is the signal received via receive antenna 213, to generate output RF signal 235. The output RF signal 235 is fed into the RX RF to analog BB circuit, 210, which is an RF down-converter, that down-converts the RF signal 235 into a baseband analog signal 211. This baseband analog signal 211 is received, filtered and sampled by RX analog BB to digital BB circuit 212, which generates and outputs sampled output signal 213. The sampled output signal 213 is fed into the RX digital BB circuit 214 including a digital receive processor that is responsible for demodulation and decoding.

RF Signal 223, a copy of the transmit signal 201 is fed into the RF up-converter and interference cancellation filter circuit 222. T RF Up-converter and interference cancellation filter circuit 222 produces signal 224 which is a negative copy or near negative copy of the interference signal received as a component of receive signal 233, said interference signal being an effect of transmission of signal 227. The combining of the negative copy 224 with the received signal 233 using a combiner/coupler device 209 results in cancellation of interference that is caused by the transmitter of transceiver circuit 102" at the receiver of transceiver circuit 102".

Channel estimator, filter and filter control circuit 216 interfaces with the digital processing block of transmit digital baseband circuit 206 and with the digital processing block of receive digital baseband circuit 214. The channel estimator, filter, and filter control circuit 216 is responsible for reconstruction of the residual interference signal that is observed at the sampled signal 220 in the RX digital baseband circuit 214. The channel estimator, filter and filter control circuit 216 is responsible for the measurement and training of a digital filter included in circuit 216 and the RF cancellation filter included in circuit 222. Channel estimator, filter, and filter control circuit 216 uses input signal 219, a copy of the digital transmit signal, and received sampled signal 220 to determine the effect of the transceiver circuit 102" and antennas (229, 231), determine the channel that causes interference, and determine the appropriate coefficients to be programmed to the RF interference cancellation filter included in circuit 222. The determined appropriate coefficients are communicated in signal 217 from channel estimator, filter and filter control circuit 216 to RF up-converter and interference cancellation filter circuit 222. Channel estimator, filter and filter control circuit 216 also recreates a negative copy 221 of the interference signal, which it sends to RX digital BB circuit 214 to be subtracted from the received signal 213. RX digital BB circuit 214 receives the recreated negative copy 221 of the interference signal and subtracts the recreated negative copy 221 of the interference signal from received signal 213, as part of its processing. Circuit 214 further generates digital data out signal 215 and outputs digital data out signal via interface 107.

Drawing 200' of FIG. 2C illustrates exemplary transceiver circuit 102''' which implements a transceiver architecture where the communications interface 113''' includes a 3-port circulator device 225. The circulator 225 is responsible for the creation of isolation between the ports in one direction. This created isolation prevents the transmit RF signal 227 leaking to the receive RF signal 233. The circulator based design facilitates simultaneous transmission and reception using a single antenna 230.

Drawing 200' of FIG. 2C illustrates exemplary transceiver circuit 102''' in accordance with an exemplary embodiment. Transceiver circuit 102''' is, e.g., transceiver circuit 102 of FIG. 1 and/or transceiver circuit 102' of FIG. 2. Transceiver circuit 102''' includes communications interface 113''' which includes circulator 225, bus interface 107, transmit (TX) digital baseband (BB) circuit 206, TX digital BB to analog BB circuit 204, TX analog BB to radio frequency (RF) circuit 202, coupler device 226, combiner/coupler device 209, RX RF to analog BB circuit 210, RX analog BB to digital BB circuit 212, RX digital BB circuit 214, RF up-converter and interference cancellation filter circuit 222, and channel estimator, filter, e.g., digital filter, and filter control circuit 216, coupled together as shown in FIG. 2C. Signal combiner 209 is for combining a received radio frequency signal 233 with the radio frequency interference cancellation signal 224 to produce a recovered radio frequency signal 235. In various embodiments, the signal combiner 209 is configured to subtract the radio frequency interference signal 233 from the received radio frequency signal 233 to generate the recovered radio frequency signal 235.

A high level overview of the transceiver circuit 102''' of FIG. 2C will now be described. The transceiver circuit 102''' comprises of a transmit chain and the receive chain. In the transmit chain, the transmit digital baseband circuit 206 receives, via bus interface 107, input data 207 to be transmitted in the form of bits, converts the bits into a digital baseband waveform 205, which is output to the TX digital BB to analog BB circuit 204. The TX digital baseband circuit 206 performs encoding and modulation of the received input data 207. The encoding and modulation performed by TX digital baseband circuit 206 uses, e.g. orthogonal frequency division multiplexing, CDMA, or another encoding and modulation scheme. The TX digital BB to analog BB circuit 204, e.g., a filter and digital to analog converter (DAC), converts the digital signal 205 into analog baseband signal 203, which is output to the transmit analog baseband to RF (TX analog BB to RF) circuit 202. Analog baseband signal 203 is received by the TX analog BB to RF circuit 202 and subsequently up-converted to the operating RF frequency using a direct conversion or an intermediate frequency converter included in circuit 202. The up-converted RF signal 201 is the output of a power amplifier included in circuit 202. The up-converted RF signal 201 is coupled or divided using a device 226 where the pass-through signal 227 goes to the communication interface 113''' and the tapped signal 223 is fed to the RF up-converter and interference cancellation filter circuit 222. The RF signal 227 in the communication interface 113''' passes through circulator 225 to the antenna 230 in case of this realization.

Antenna 230 receives a wireless RF signal and outputs received signal into circulator 225 of interface 113'', which sends the received signal 233 toward the receive chain. On the receive side of the transceiver circuit 102''', the receive signal 233 from the communication interface 113''' feeds into a coupler or combiner 209 which is 3 port device. Coupler or combiner 209 is responsible for combining input signal 224, which is an output of the RF-up converter and interference cancellation filter circuit 222, and input signal 233, which is the signal received via antenna 230, to generate output RF signal 235. The output RF signal 235 is fed into the RX RF to analog BB circuit 210, which is an RF down-converter, that down-converts the RF signal 235 into a baseband analog signal 211. This baseband analog signal 211 is received, filtered and sampled by RX analog BB to digital BB circuit 212, which generates and outputs sampled output signal 213. The sampled output signal 213 is fed into the RX digital BB circuit 214 including a digital receive processor that is responsible for demodulation and decoding.

RF Signal 223, a copy of the transmit signal 201 is fed into the RF up-converter and interference cancellation filter circuit 222. RF Up-converter and interference cancellation filter circuit 222 produces signal 224 which is a negative copy or near negative copy of the interference signal received as a component of receive signal 233, said interference signal being an effect of transmission of signal 227. The combining of the negative copy 224 with the received signal 233 using a combiner/coupler device 209 results in cancellation of interference that is caused by the transmitter of transceiver circuit 102''' at the receiver of transceiver circuit 102'''.

Channel estimator, filter and filter control circuit 216 interfaces with the digital processing block of transmit digital baseband circuit 206 and with the digital processing block of receive digital baseband circuit 214. The channel estimator, filter, and filter control circuit 216 is responsible for reconstruction of the residual interference signal that is observed at the sampled signal 220 in the RX digital baseband circuit 214. The channel estimator, filter and filter control circuit 216 is responsible for the measurement and training of a digital filter included circuit 216 and the RF cancellation filter included in circuit 222. Channel estimator, filter, and filter control circuit 216 uses input signal 219, a copy of the digital transmit signal, and received sampled signal 220 to determine the effect of the transceiver circuit 102''' and antenna 230, determine the channel that causes interference, and determine the appropriate coefficients to be programmed to the RF interference cancellation filter included in circuit 222. The determined appropriate coefficients are communicated in signal 217 from channel estimator, filter and filter control circuit 216 to RF up-converter and interference cancellation filter circuit 222. Channel estimator, filter and filter control circuit 216 also recreates a negative copy 221 of the interference signal, which it sends to RX digital BB circuit 214 to be subtracted from the received signal 213. RX digital BB circuit 214 receives the recreated negative copy 221 of the interference signal and subtracts the recreated negative copy 221 of the interference signal from received signal 214, as part of its processing. Circuit 214 further generates digital data out signal 215 and outputs digital data out signal via interface 107.

Drawing 200' of FIG. 2C illustrates exemplary transceiver circuit 102''' which implements a transceiver architecture where the communications interface 113''' includes a 3-port circulator device 225. The circulator 225 is responsible for the creation of isolation between the ports in one direction. This created isolation prevents the transmit RF signal 227 leaking to the receive RF signal 233. The circulator based design facilitates simultaneous transmission and reception using a single antenna 230.

The communication interface, e.g., communications interface (113, 113', 113'', 113''''') of a transceiver circuit (102, 102', 102'', 102''') can take many forms to realize coupling into a wireless channel or into a cable plant in case of a wired system.

The RF up-converter and interference cancellation filter circuit 222 and the channel estimator, filter, e.g., digital cancellation filter, and filter control circuit 216, described with respect to FIG. 2B and FIG. 2C, are shown to cancel the interference from one transmit chain to one receive chain. However, same principle regarding interface can be, and in some embodiments is, used to cancel interference from many transmit chain to many receive chain. Thus in some embodiments, the transceiver circuit, e.g., transceiver circuit 102 includes a plurality of transmit chains and a plurality of receive chains. In some such embodiments, RF Up-converter and interference cancellation filter circuit 222 and channel estimator filter, and filter control circuit 216 perform are used to cancel interference from the plurality of transmit chains to the plurality of receive chains.

Figure 4:
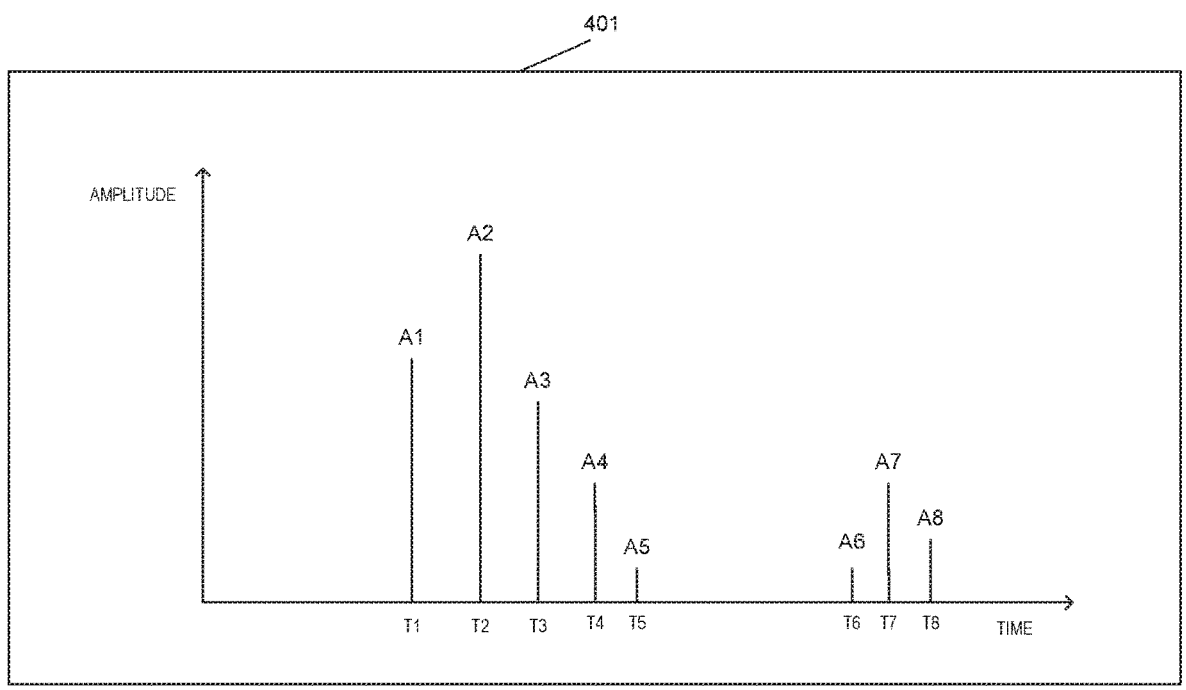
FIG. 4 is a drawing illustrating a representation of an exemplary delay profile of a self-interference signal received by a receiver of a device which transmitted the interference signal which is also being received a self interference.

FIG. 4 includes diagram 401 which illustrates an exemplary delay profile of an exemplary received self interference signal. The delay profile shows the contribution of 8 reflections of the original transmitted signal but 50, 100 or even more reflections may be received potentially with different delays from the original transmit time. For this reason the ability to support a larger number of filter taps and/or delays can be desirable. As should be appreciated, the multipath of a transmitted signal will be perceived at the receiver not as a single interference signal but as multiple different interference signals received with varying delays from the original transmit time and different received amplitudes since different paths may have different amounts of loss.

The vertical axis in FIG. 4 represents the amplitude of a received interfering copy of a transmitted signal while the horizontal axis represents time. The larger the time value the longer the delay in time from the point in time at which the interfering signal was transmitted by the device receiving the interfering version, e.g., reflection, of the transmitted signal. Each reflection maybe considered a copy of the original signal.

In the FIG. 4 example is can be seen that copies of a transmitted signal will be received at a delay (T1) from the original transmission. Another copy will be received at time (T2), another copy received at T3 and so on through time period T8. The amplitude shows the relative strength of each received signal with each received signal being a fraction of the overall initial transmit power. The interference profile affecting the received signal may and often does depend on objects in the environment and their motion in the environment which can affect signal reflections. The delay profile can at least be partially predicted based on channel information since the delays are a function of the channel between a device's transmitter and receiver. Thus, channel information and channel estimates can be used to determine the delay profile which will be encountered. Channel estimation information can and in some embodiments is used in determining filter coefficients used to control one or more filters responsible for generating an interference cancelation signal.

By knowing the delay profile shown in FIG. 4 it is possible to predict how much signal energy of a transmitted signal will be received at a time period following the known transmission time period.

By using channel information, e.g. which can be used to determine when and how much a signal transmitted by a device will be received by the receiver of the device, it is possible to generate a composite waveform representing the expected contribution at a particular receive time of the interference from the previously transmitted signals given that the transmitted waveforms, transmit power levels and interference delay profile associated with a device can be known and/or estimated based on a channel estimate generated by the device suffering from the self interference.

Using the transmitted signal information including transmitted waveform and power level information along with channel estimation information, in accordance with the invention, gain and delay filter coefficients are determined which can and are used to control one or more optical filters to generate interference cancelation waveforms which can be converted from an optical signal to an analog RF signal. The analog RF interference cancelation signal is then combined with a received signal to cancel some or all of the self interference.

Various exemplary circuits and devices, at least some of which use optical filters, for implementing self interference cancelation will be discussed further below.

In various embodiments, RF photonics, is used in a hybrid RF/optical approach that processes RF signals in an optical domain and then coverts the optical signals to the RF domain to generate an interference cancelation signal that is well suited for combining with a received RF signal. In the RF photonics system, an analog RF signal defines the envelope of an optical carrier wave, typically around 200 THz. Therefore, even multi-GHz ultra-wideband signals occupy a fractional bandwidth of less than 10-5. Similarly, millimeter-wave baseband frequencies are far smaller than the typical bandwidth of optical components. Therefore, RF photonics is a powerful approach that is transparent to the RF baseband frequency, provided that a broadband modulator is used. Space-wise, optical delay lines in the form of optical fibers can be, and in some embodiments are, coiled into centimeter loops, and multiple delay lines can be, and in some embodiments are, stacked together vertically, and packed into a footprint that is 4 to 5 times smaller than microwave delay lines for a 12-tap cancellation filter. Unlike the microwave filter, increasing the tap number from 12 to 64 in a RF-photonic filter only increases the height of the system, and allows for much better analog cancellation without increasing system footprint. Another important feature of RF photonic link is its fundamentally unidirectional nature, i.e. the signal path is fixed from the optical modulator (RF-to-optics) towards the optical detector (optics-to-RF), since neither device operates in a reversible fashion. Besides these technical advantages, RF-photonic approach has also benefited economically from the tremendous progress with investments in long-haul telecommunication industry, in terms of performance improvement and cost reduction. Besides addressing the challenges directly related to full-duplex transceiver, RF photonic systems also enjoy several additional advantages unique to its hybrid architecture. First, at high power, laser source provides an overall gain to the RF transfer function, which can be, and in some embodiments are, adjusted on demand. Secondly, using coherent RF photonic systems, full complex-valued filter coefficients can be, and in some embodiments are, realized by adjusting the optical phase, which only requires sub-micron displacement and can be realized with time constants less than 1 μs. More recently, on-chip optical signal processing has been realized via opto-mechanical effects: a mm long chip can provide the sample processing power which previously required 100 meters of optical fibers.

Active analog cancellation currently provides an additional 30-35 dB cancellation through an adaptive RF filter controlled by algorithms running on a processor which subtracts a reproduced copy of the remaining interference from the received signal. This RF filter typically includes an array of programmable delay lines followed by programmable attenuators, with the digital control loop running on a processor that tunes the delay and attenuation coefficients to minimize residual interference. Since these coefficients mimic the effect of all scattering paths between the transmitter and receiver, in some embodiments, the received signal is monitored, e.g., continuously monitored, and these coefficients are tuned, e.g., continuously tuned, to adapt with the changing environment. The active analog cancellation using a novel RF-photonic filter, in accordance with various embodiments, of the present invention, is expected to provide more than 50 dB of cancellation over a flexible bandwidth from 10 to 160 MHz.

The 50+dB cancellation, a much improved performance from state-of-art active analog cancellation filter allows the potential elimination of RF circulators and the use of simpler and broadband RF isolator instead. The superior cancellation performance is realized by an IIR RF-photonic filter, using a configuration shown in an exemplary embodiment of FIG. 5. A 64-tap IIR filter, producing the numerator of the IIR response, is made possible by the inherent space-efficiency of optical delay lines. This filter also provides far greater frequency resolution than that of state-of-art active cancellation filters. In some embodiments, variable optical attenuators are used to adjust the attenuation coefficients, and negative coefficients are generated through a balanced photo-detector. In addition, in some embodiments, a 4th-order fiber-optic ring resonator, also with adjustable attenuation coefficients, is used to realize the denominator response of the IIR filter. The added feedback provides additional cancellation beneficial to multi-echo interference between strong scatterer and antennas. Bandwidths of the optical delay lines and attenuators exceed 10 THz, thus the RF filter bandwidth is largely determined by the bandwidth of the electro-optical modulator and the photo-detector, which is been demonstrated to be more than 100 GHz. Such large bandwidth not only allows the RF photonic analog cancellation filter to operate in a carrier frequency agnostic fashion, but also enables it to be readily extended towards higher carrier frequencies and ultra-wide bandwidth, beyond the 20 GHz limit of current ferrite technology.

Various features of the present invention and the proposed approach are good with regard to: 1) Delay bandwidth: the optical bandwidth over which a certain delay can be achieved; 2) Maximum delay: the maximum achievable delay value; 3) Fractional delay: the absolute delay value divided by the pulse width or bit time. This is important to the delay/storage capacity; 4) Delay range: the tuning range that the delay can be achieved (from minimum value to maximum achievable value); 5) Delay resolution: the minimum incremental delay tuning step; 6) Delay accuracy: the precision percentage of the actual delay to that of the desired delay value; 7) Delay reconfiguration time: the amount of time it takes to switch a delay from one state to another steady state; 8) Loss over delay: The amount of loss incurred per unit delay. Lower loss per unit delay is desired.

Figure 3:
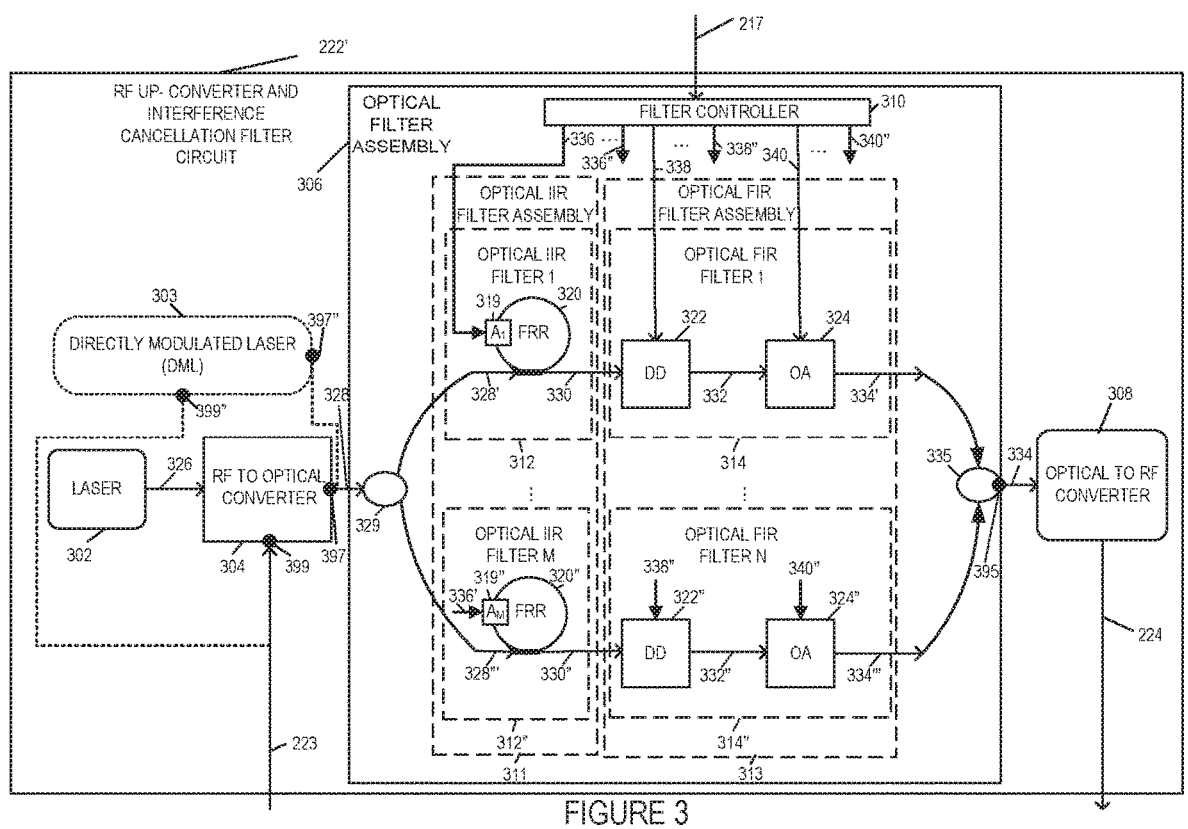
FIG. 3 is a drawing of an exemplary optical filter assembly in accordance with an exemplary embodiment.

FIG. 3 illustrates an exemplary RF-up converter and interference cancellation filter circuit 222' in accordance with an exemplary embodiment, which is one exemplary realization of the RF filter 222 included in an exemplary transceiver circuit 102, 102' 102" or 102'''.

RF up-converter and interference cancellation filter circuit 222' includes a laser 302, a radio frequency (RF) to optical signal converter 304, an optical filter assembly 306 and an optical to radio frequency (RF) converter 308 coupled together as shown in FIG. 3. In some embodiments, laser 302 and RF to optical converter 304 are replaced by directly modulated laser 303.

Radio frequency signal to optical signal converter 304 has a radio frequency input 399 configured to receive a radio frequency signal, e.g. RF signal 223, and an optical output 397 for outputting a first optical signal 328 generated from said radio frequency signal, e.g., RF signal 233, to be communicated. Optical filter assembly 306 is for filtering the first optical signal 328. Optical to radio frequency converter 308 is coupled to an output 395 of the optical filter assembly 306, said optical to radio frequency converter 308 for generating a radio frequency interference cancellation signal 224 from a second optical signal 334 output by the optical filter assembly 306.

Optical filter assembly 306 includes an optical IIR filter assembly 311, an optical FIR filter assembly 313, a filter controller 310, an optical input coupler 329, and an optical output coupler 335, coupled together as shown in FIG. 3. Optical IIR Filter assembly 311 includes a plurality of optical IR filters (optical IIR filter 1 312, . . . , optical IIR filter M 312"). Optical FIR filter assembly 313 includes a plurality of optical FIR filters (optical FIR filter 1 314, . . . , optical FIR filter N 314").

Each optical IIR filter (optical IIR filter 1 312, . . . , optical IIR filter M 312") includes a fixed optical delay element (fiber ring resonator 320, . . . , fiber ring resonator 320") and a gain control element, e.g., a controllable gain control element (controllable gain control element A1 319, . . . , controllable gain control element 319"), respectively.

Each optical FIR filter (optical FIR filter 1 314, . . . , optical FIR filter N 314") includes a controllable optical delay element (controllable optical delay device (DD) 322, . . . , controllable optical delay device 322"), and an optical amplifier with a controllable gain (optical amplifier 324 with a controllable gain, . . . , optical amplifier 324" with a controllable gain).

Laser 302 generates optical signal 326 which is input optical signal to RF to optical converter 304. The RF to optical converter 304 receives input RF signal 223 on radio frequency input 339 and generates output optical signal 328, which is output on optical output 397. Alternatively, directly modulated laser 303 receives input RF signal 223 on radio frequency input 399" and generates output optical signal 328, which is output on optical output 397". Optical signal 328 is an input to optical filter assembly 306. Optical signal 328 is received by optical input coupler 329 which outputs optical signals (328', . . . , 328''') to each of the optical IIR filters (optical IIR filter 1 312, . . . , optical IIR filter M 312"). In some embodiment, optical signals (328', . . . 328''') are copies of optical signal 328.

Filter controller 310 receives input signal 217 and generates, based on the received input signal 217: (i) controls signals (336, . . . , 336") for controlling the controllable gain elements (A1 319, . . . AM 319"), respectively, (ii) control signals (338, . . . , 338") for controlling the controllable optical delay elements (optical delay device 322, . . . , optical delay device 322"), respectively, and (iii) control signals (340, . . . , 340") for controlling the optical amplifiers with controllable gain (OA 324, . . . , OA 324"). Thus filter controller 310 supplies independent gain control signals (336, . . . , 336") to each of the gain control elements (319, . . . 319") of the optical IIR filter assembly 311. Filter controller 310' further controls the amount of delay implemented by controllable optical delay elements (322, . . . 322") and the gain for the optical amplifiers (324, . . . , 324").

Optical signal 328' is input to optical IIR filter 1 312 including FRR 320, processed and output from IIR filter 1 312 as optical signal 330, with input optical signal 328' being subjected to a fixed delay corresponding to FFR 320 and a controllable gain from delay element A1 319. Optical signal 330 is input to optical delay device 322, delayed in accordance with the controlled delay of device 322, and output as optical signal 332. Optical signal 332 is input to controllable optical amplifier 324, amplified in accordance with the controlled amplification setting of amplifier 324 and output as optical signal 334'.

Optical signal 328'' is input to optical IIR filter M 312" including FRR 320", processed and output from IIR filter M 312" as optical signal 330", with input optical signal 328''' being subjected to a fixed delay corresponding to FFR 320" and a controllable gain from delay element AM 319". Optical signal 330" is input to optical delay device 322", delayed in accordance with the controlled delay of device 322", and output as optical signal 332". Optical signal 332" is input to controllable optical amplifier 324", amplified in accordance with the controlled amplification setting of amplifier 324" and output as optical signal 334'''.

The output optical signal (334', . . . , 334''') from each of the FIR filters (314, . . . , 314") are input into optical coupler/combiner 335. The output of optical output coupler 335 is an optical output of optical filter assembly 306, which outputs optical signal 334, which is a combined optical signals from signals (334', . . . , 334'''). Optical to RF converter 308 receives optical signal 334 and generates RF signal 224 which is output from the RF up converted and interference cancellation filter circuit 222'.

The main architecture for RF signal processing using the RF-up converter and interference cancellation filter circuit 222' is to up-convert the RF signal 223 using an optical carrier. The up-conversion is carried using a RF to optical converter 304. The up-conversion process is realized using either an externally modulated laser 302 where the laser output signal 326 is modulated externally by RF to optical converter 304 or a directly modulated laser (DML) 303 where the laser 302 and RF to optical converter 304 are realized using one element, DML 303. The output of the RF converted to optical signal 328 is input to the optical filter assembly 306. The optical filter 306 assembly includes an optical infinite impulse response (IIR) filter assembly 311 and an optical finite impulse response (FIR) assembly 313. The optical filter assembly subjects the input optical signal 328 to optical filtering and outputs optical signal 334. The output optical signal 334 of the optical filter assembly 306 is input to optical to RF converter 308. The optical to RF converter 308 converts the optical signal 334 back to RF, generating and outputting RF signal 224.

The exemplary IIR filter assembly 311 described in FIG. 3 is realized using fiber ring resonators (320, . . . , 320") and controllable gain elements (A1 319, . . . , AM 319".) The FIR filter assembly 313 is realized using controllable optical delay devices (DD 322, . . . , DD 322") and controllable optical amplifiers (OA 324, . . . , OA 324").

Optical IIR filter 1 312 includes Fiber ring resonator 320, e.g., a fixed delay device, which delays the input optical signal 328' and combines the delayed optical signal with the incoming optical signal 328', thus FRR 320 control the delay. Optical IIR filter 1 312 further includes a controllable gain element A1 319 which controls the amplitude based on the control signal 336 received from controller 310.

Optical IIR filter M 312" includes Fiber ring resonator 320", e.g., a fixed delay device, which delays the input optical signal 328' and combines the delayed optical signal with the incoming optical signal 328', thus FRR 320" control the delay. Optical IIR filter M 312" further includes a controllable gain element AM 319" which controls the amplitude based on the control signal 336" received from controller 310.

In this exemplary embodiment shown in FIG. 2, each IIR filter has a fixed delay and a variable gain. In some embodiments, each IIR filter has a fixed gain and fixed delay. In some embodiments, each IIR filter has a variable gain and a variable delay. In some embodiments, at least one IIR filter has a fixed delay and a variable gain. In some embodiments, at least one IIR filter has a fixed gain and fixed delay. In some embodiments, at least one IIR filter has a variable gain and a variable delay.

Thus, in some embodiments, the optical IIR filter assembly 311 is implemented with fixed gain and fixed delay and/or with variable gain and variable delay. In some embodiments, the IIR filter assembly is implemented where a plurality of these IIR filters (312, . . . 312") operate on signal 328. In this realization, the optical signal 328 can be, and sometimes is, power divided/split in to multiple optical signals (328', . . . , 328''') that feed in to multiple optical IIR filter blocks (312, . . . 312"). The output of these optical IIR filter blocks (312, . . . 312") then can be combined using an optical combiner.

Optical FIR filter assembly 1 314 described in FIG. 3 is implemented using a controllable delay element 322 and controllable optical amplifier 324, e.g., a controllable optical attenuator. Optical FIR filter assembly N 314" described in FIG. 3 is implemented using a controllable delay element 322" and controllable optical amplifier 324", e.g., a controllable gain device which can be controlled for optical gain greater than 1 and for optical gain less than 1, e.g., optical attenuation.

In some embodiments, the control of delay and control of gain, e.g., amplification greater than 1 or attenuation, is performed using a programmable current or programmable voltage supply. In some embodiments, delay is controlled via current and gain is controlled via voltage.

Figure 9:
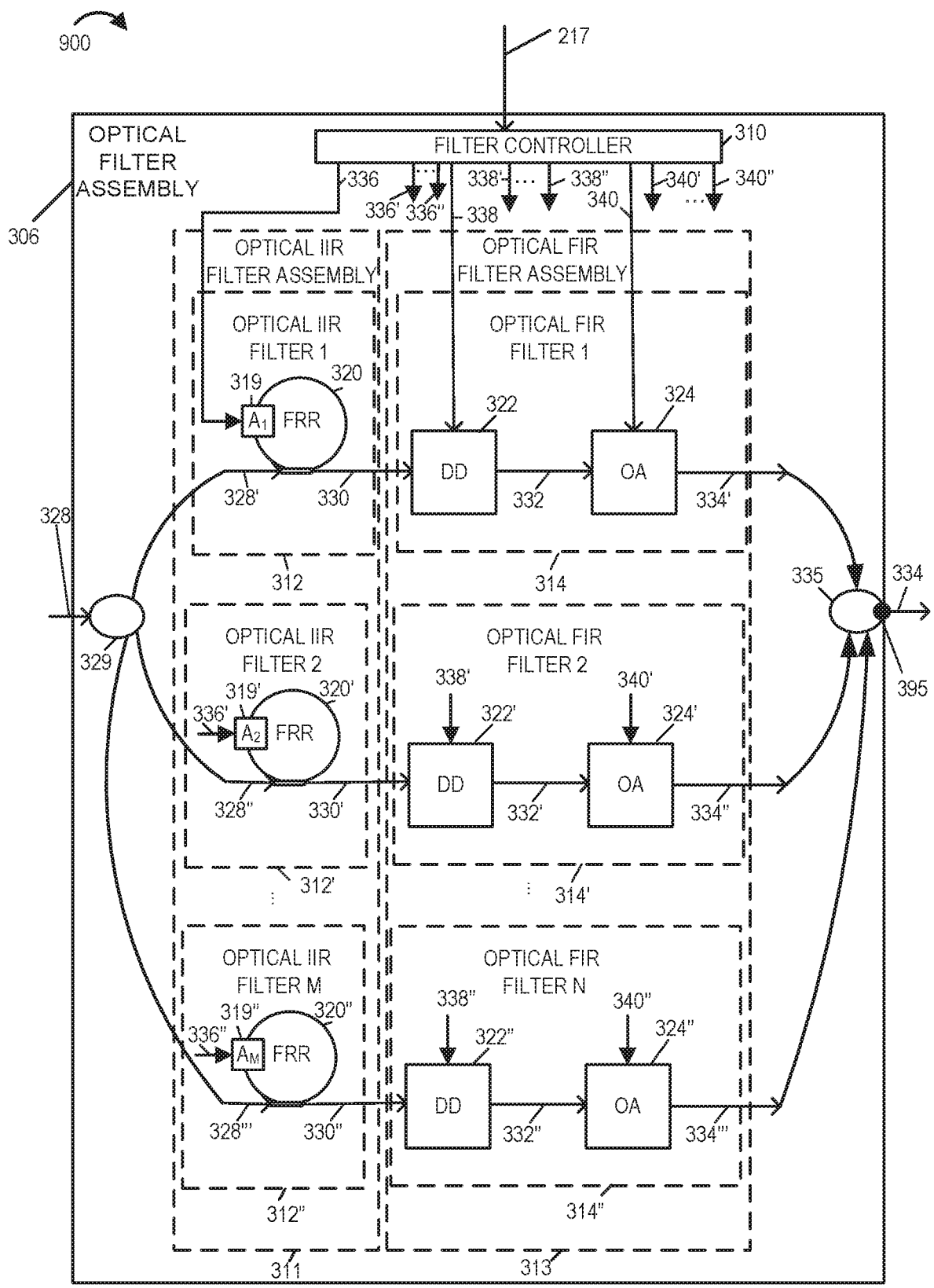
FIG. 9 shows the optical filter assembly of FIG. 3 in greater detail, e.g., with more optical filters than shown in the FIG. 3 example due to space limitations.

FIG. 9 is a drawing 900 illustrating the optical filter assembly 306 of FIG. 3 and further illustrating components and signals corresponding to a second optical IIR filter, optical IIR filter 2 312' and a second optical FIR filter, optical FIR filter 2 314'. Optical IIR filter 2 312' includes fixed delay element FFR 320' and controllable gain element A2 319'. Optical FIR filter 2 314' includes controllable optical delay element DD 322' and controllable optical gain element OA 324'. Filter controller 310 generates: control signal 336' to control gain element A2 319', control signal 338' to control DD 322', and control signal 340' to control optical amplifier 324'. Optical signal 328' output from coupler 329 is an input to optical IIR filter 2 312', and optical signal 330' is an output optical signal from optical IIR filter 2. Optical signal 330' is input to optical DD 322' of Optical FIR filter 2 314'; optical signal 332' is an output form DD 322' and an input to OA 324' of optical FIR filter 2 314'. Optical signal 334" is an output of OA 324' and an input to coupler/combiner 335.

In some embodiments, the controllable optical amplifiers (324, 324', . . . , 324") can have positive or negative gains, e.g., in dB scale. Thus, in such an embodiment, an individual optical amplifier, e.g. device 324, may serve as a positive gain amplifier or as an attenuator, e.g., device 324 can be controlled to go either way depending upon the losses in the channel.

In some embodiments, the controllable optical amplifiers (324, 324', . . . , 324") have positive gains, in dB scale i.e. gain greater than 1 in real scale.

In some embodiments, the controllable optical amplifiers (324, 324', . . . , 324") have negative gains, in dB scale i.e. gain less than 1 in real scale.

Figure 5:
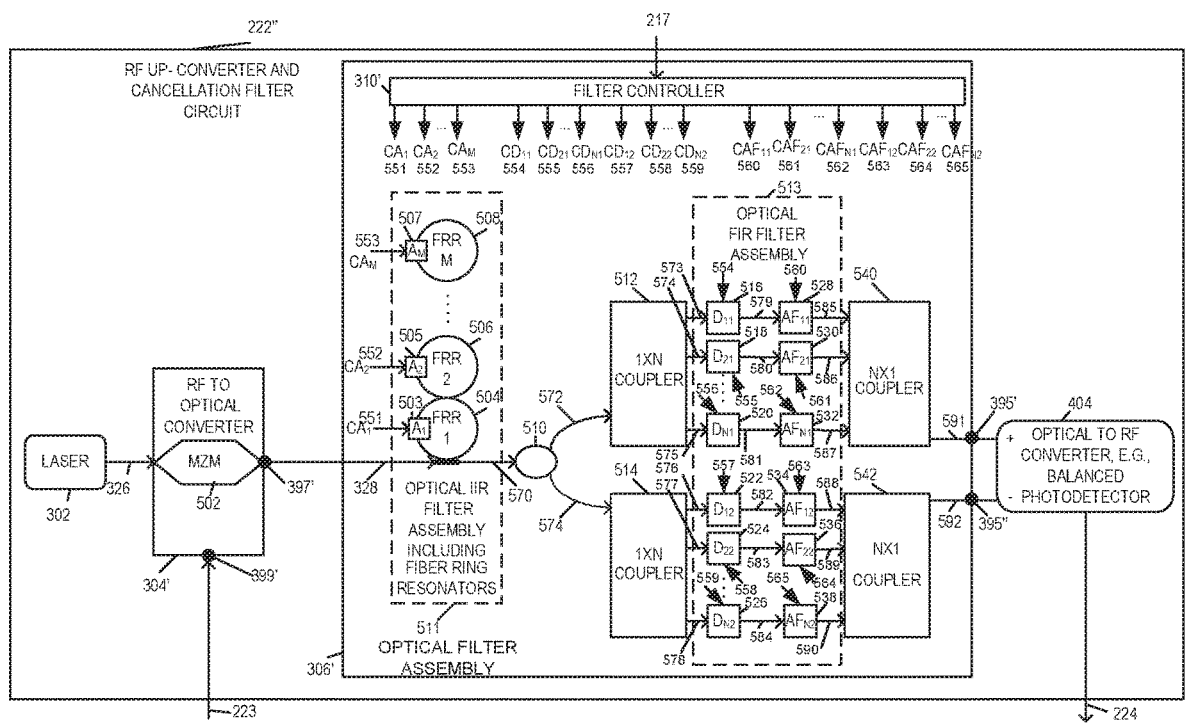
FIG. 5 is a drawing of another exemplary optical filter assembly in accordance with an exemplary embodiment.

FIG. 5 illustrates an exemplary RF-up converter and interference cancellation filter circuit 222" in accordance with another exemplary embodiment, which is one exemplary realization of the RF filter 222 included in an exemplary transceiver circuit 102, 102' 102" or 102'''.

RF up-converter and interference cancellation filter circuit 222" includes a laser 302, an RF signal to optical signal converter 304' including a Mach-Zehnder modulator (MZM) 502, an optical filter assembly 306' and an optical to RF converter 404, e.g., a balanced photo-detector, coupled together as shown in FIG. 5. In some embodiments, laser 302 and RF to optical converter 304' are replaced by a directly modulated laser, e.g., DML 303 shown in FIG. 3.

Radio frequency signal to optical signal converter 304' has a radio frequency input 399' configured to receive a radio frequency signal, e.g. RF signal 223, and an optical output 397' for outputting a first optical signal 328 generated from said radio frequency signal, e.g., RF signal 233, to be communicated. Optical filter assembly 306' is for filtering the first optical signal 328. Optical to radio frequency converter 404 is coupled to an output 395' of the optical filter assembly 306', said optical to radio frequency converter 404 for generating a radio frequency interference cancellation signal 224 from a second optical signal 591 output by the optical filter assembly 306'. In various embodiments, the optical to radio frequency converter 404 is a balanced photodetector, and the optical to radio frequency converter 404 generates the radio interference signal 224 from the second optical signal 591 and a third optical signal 592 output from the optical filter assembly 306'.

Figure 10:
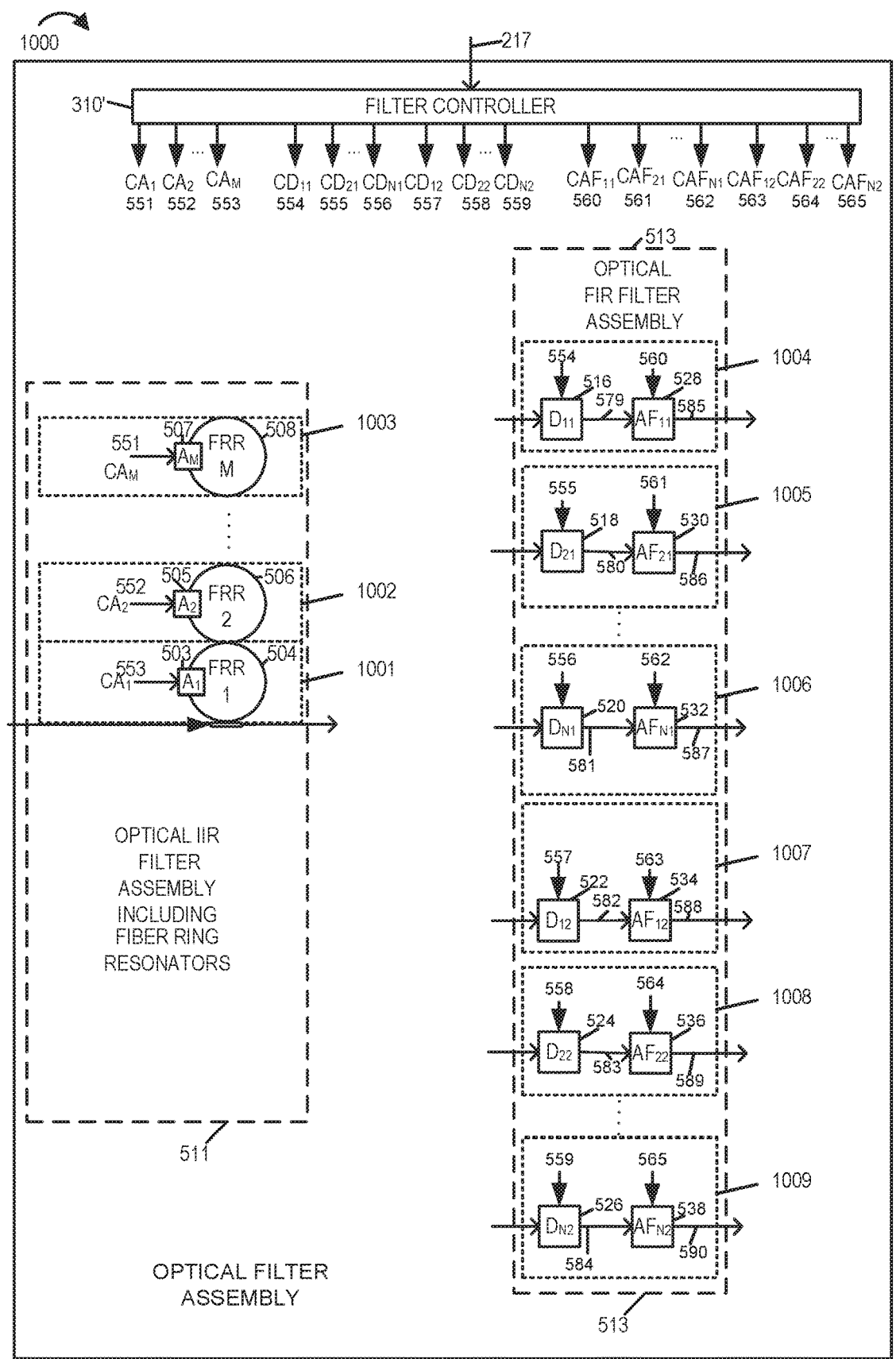
FIG. 10 shows the optical filter assembly of FIG. 5 in greater detail, e.g., with more optical filters than shown in the FIG. 3 example due to space limitations.

Optical filter assembly 306' includes an optical IIR filter assembly 511, an optical FIR filter assembly 513, a filter controller 310', a 1 to 2 optical coupler 510, two 1 to N optical couplers (512, 514) and two N to 1 optical couplers (540, 542) coupled together as shown in FIG. 5. Optical IIR Filter assembly 511 includes a plurality of optical IIR filters coupled together, each optical IIR filter including a fixed delay element, which is a fiber ring resonator (FRR) and a controllable gain element. Drawing 1000 of FIG. 10 illustrates individual optical IIR filters (optical IIR filter 1 1001, optical IIR filter 2 1002, . . . , optical IIR filter M 1003) included in optical IIR filter assembly 511. Each optical IIR filter (optical IIR filter 1 1001, . . . , optical IIR filter 2 1002, . . . , optical IIR filter M 1003) includes a fixed optical delay element (fiber ring resonator (FRR) 1 504, fiber ring resonator 2 506, . . . , fiber ring resonator M 508) and a gain control element, e.g., a controllable gain control element (controllable gain control element A1 503, controllable gain control element A2 505, . . . , controllable gain control element AM 507), respectively.

Optical FIR Filter assembly 512 includes a plurality of optical FIR filters, each optical FIR filter including a controllable optical delay element, e.g., a delay device, and a controllable gain element. Drawing 1000 of FIG. 10 illustrates individual optical FIR filters (optical FIR filter 11 1004, optical FIR filter21 1005, . . . , optical FIR filterN1 1006, optical FIR filter12 1007, optical FIR filter22 1008, . . . , optical FIR filterN2 1009) included in optical FIR filter assembly 513. Each optical FIR filter (optical FIR filter11 1004, optical FIR filter 21 1005, . . . , optical FIR filterN1 1006, optical FIR filter12 1007, optical FIR filter 22 1008, . . . , optical FIR filterN2 1009 includes a controllable optical delay element (delay device D11 516, delay device D21 518, . . . , delay device DN1 520, delay device D12 522, delay device D22 524, . . . , delay device DN2 526,) and a gain control element, e.g., a controllable gain element (controllable gain element AF11 528, controllable gain element AF21 530, . . . , controllable gain element AFN1 532, controllable gain element AF12 534, controllable gain element AF22 536, . . . , controllable gain element AFN2 538), respectively.

Laser 302 generates and outputs optical signal 326, which is sent to RF to optical converter 304, which receives optical signal 326. The RF to optical converter also 304 receives input RF signal 223 on radio frequency input 339 and generates output optical signal 328, which is output on optical output 397. Alternatively, directly modulated laser 303 receives input RF signal 223 on radio frequency input 399" and generates output optical signal 328, which is output on optical output 397". Optical signal 328 is an input to optical filter assembly 306'. Optical signal 328 is processed by the optical IIR filter assembly 511, which generates and outputs optical signal 570. The optical IIR filter assembly 511 subjects the input optical signal 328 to: delays in accordance with the fixed delays corresponding to the FRRs (504, 506, . . . , 508) and gain adjustments in accordance with the controlled gain adjustments in accordance with the controlled gain settings of gain control elements (A1 503, A2 505, . . . , AM 507) generating an optical output signal 570 of the optical IIR filter assembly 511. In various embodiments, the FFRs (504, 506, . . . 508) of the optical IIR filter assembly 511 are coupled to one another.

Filter controller 310' receives input signal 217 and generates, based on the received input signal 217: (i) controls signals (CA1 551, CA2 552, . . . , CAM 553) for controlling the controllable gain elements (A1 503, A2 505, . . . AM 507), respectively, (ii) control signals (CD11 554, CD21 555, . . . , CDN1 556, CD12 557, CD22 558, . . . , CDN2 559) for controlling the controllable optical delay elements (controllable optical delay device D11 516, controllable optical delay device D21 518, . . . , controllable optical delay device DN1 520, controllable optical delay device D12 522, controllable optical delay device D22 524, . . . , controllable optical delay device DN2 526), respectively, and (iii) control signals (CAF11 560, CAF21 561, . . . , CAFN1 562, CAF12 563, CAF22 564, . . . , CAFN2 565) for controlling the controllable gain elements (AF11 528, AF21 530, . . . , AFN1 532, AF12 534, AF22 538, . . . , AFN2 540), respectively. Thus filter controller 310' supplies independent gain control signals (551, 553 . . . , 553) to each of the gain control elements (503, 505 . . . 507) of the optical IIR filter assembly 511. Filter controller 310' further controls the amount of delay implemented by controllable optical delay elements (516, 518, 520, . . . , 522, 524, . . . , 526) and the gain for the optical amplifiers (528, 530, . . . , 532, 534, 536, . . . , 538).

Optical signal 570, which is output from the optical IIR filter assembly 511 is input to a coupler 510, e.g., a 1 to 2 splitter, which generates optical signals 572 and 574. Optical signal 574 is input to a 1×N coupler 512 which outputs optical signals (573, 574, . . . , 576) to the input of controllable delay devices (D11 516, D21 518, . . . DN1 520), respectively. Optical signal 574 is input to a 1×N coupler 514 which outputs optical signals (576, 577, . . . , 578) to the input of controllable delay devices (D12 522, D22 524, . . . DN2 526), respectively. Optical delay devices (D11 516, D21 518, . . . , DN1 520, D12 522, D22 524, . . . , DN2 526) introduce delays corresponding to the controlled delay setting based on the filter control signals (554, 555, . . . , 556, 557, 558, . . . , 559), generating optical signals (579, 580, . . . , 581, 582, 583, . . . , 584), respectively.

Optical signals optical signals (579, 580, . . . , 581, 582, 583, . . . , 584) are input of controllable gain elements (AF11 528, AF21 530, . . . , AFN1 532, AF12 534, AF22 538, . . . , AFN2 540), respectively. The controllable gain elements (AF11 528, AF21 530, . . . , AFN1 532, AF12 534, AF22 538, . . . , AFN2 540) adjust gains corresponding to the controlled gains settings based on the filter control signals (560, 561, . . . , 562, 563, 564, . . . , 565), generating optical signals (585, 586, . . . , 587, 588, 589, . . . , 590), respectively. Optical signals (585, 586, . . . , 587) are input to N×1 optical coupler 540 which combines the signals and outputs optical signal 591. Optical signals (588, 589, . . . , 590) are input to N×1 optical coupler 542 which combines the signals and outputs optical signal 592. Optical signal 591 is output on output 395' of optical filter assembly 306'. Optical signal 592 is output on output 395" of optical filter assembly 306'. Outputs (395' and 395") couple the optical filter assembly 306' to optical to RF converter 404, e.g., a balanced photo-detector. Optical to RF converter 404 receives optical signals (591, 592) and generates and outputs RF signal 224. In the FIG. 5 implementation, the RF up-converter and cancellation filter circuit 222' includes multiple FIR filter branches which are shown. The optical signal 570, which is output from the optical FIR filter assembly 511 is split in to multiple branches using optical couplers 510, 512 and 514. The output filtered optical signals (585, 586, . . . , 587) from optical FIR filter assembly 513 are combined using optical coupler 540, which generates optical output signal 591. The output filtered optical signals (588, 589, . . . , 590) from optical FIR filter assembly 513 are combined using optical coupler 542, which generates optical output signal 592. The optical signals 591, 592 are then combined using an optical to RF converter 404, e.g., a balanced photo-detector to generate an RF signal 224

Figure 6:
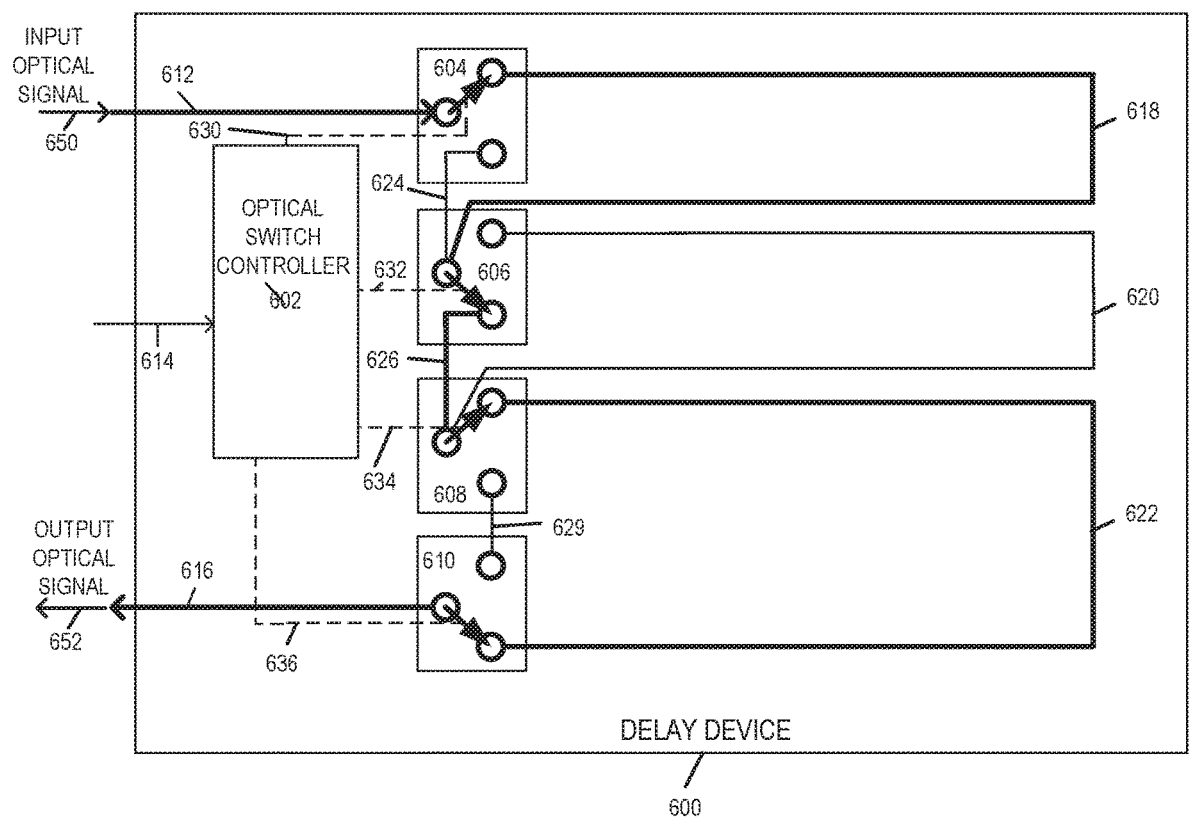
FIG. 6 is a drawing of an exemplary controllable optical delay device including an optical delay line a switch matrix in accordance with an exemplary embodiment.

FIG. 6 is a drawing of an exemplary controllable delay element 600, e.g., delay device, in accordance with an exemplary embodiment. Exemplary controllable delay element is, e.g., one of the controllable delay devices (322, 322', . . . , 322") of FIG. 3 or FIG. 9 or one of the controllable delay devices (516, 518, . . . , 520, 522, 524, . . . , 526) of FIG. 5 or FIG. 10. Controllable delay element 600 is a switch based optical delay device including a plurality of switches switch (604, 606, 608, 610) for altering an optical path through the first switch based optical delay device.

In this exemplary embodiment shown in FIG. 6, the controllable delay element 600 is implemented using optical waveguides (612, 618, 624, 620, 626, 622, 629, 616) and optical switches (604, 606, 608, 610). The optical switches (604, 606, 608, 610), based upon their settings, control the route of an input optical signal 650. For example, consider that controllable delay element 600 is DD 322 of optical FIR filter 1 314 of FIG. 3, the input optical signal 650 is optical signal 330 of FIG. 3. The switches (604, 606, 608, 610) are controlled using a optical switch controller 902 which is capable of individually controlling these switches (604, 606, 608, 610). The input signal 650 comes out as output signal 652 after a certain delay which depends on the settings programmed through the control signal 614 to the controller 602. Consider that the controllable delay element 600 is DD 322 if FIG. 3, input control signal 614 is signal 338 of FIG. 3. The controller 602 receives control signal 614 and generates and sends switch setting control signals (630, 632, 634, 636) to control switches (604, 606, 608, 610) to be set to a desired position to implement a desired delay path. In the example, shown in FIG. 6, the switches are set to implement a waveguide path including optical waveguides (612, 618, 626, 622, and 616). In this exemplary switch setting, optical waveguides (624, 620 and 629) are not in use. Consider that controllable delay element 600 is DD 322 of optical FIR filter 1 314 of FIG. 3, the output optical signal 652 is optical signal 332 of FIG. 3.

Figure 7:
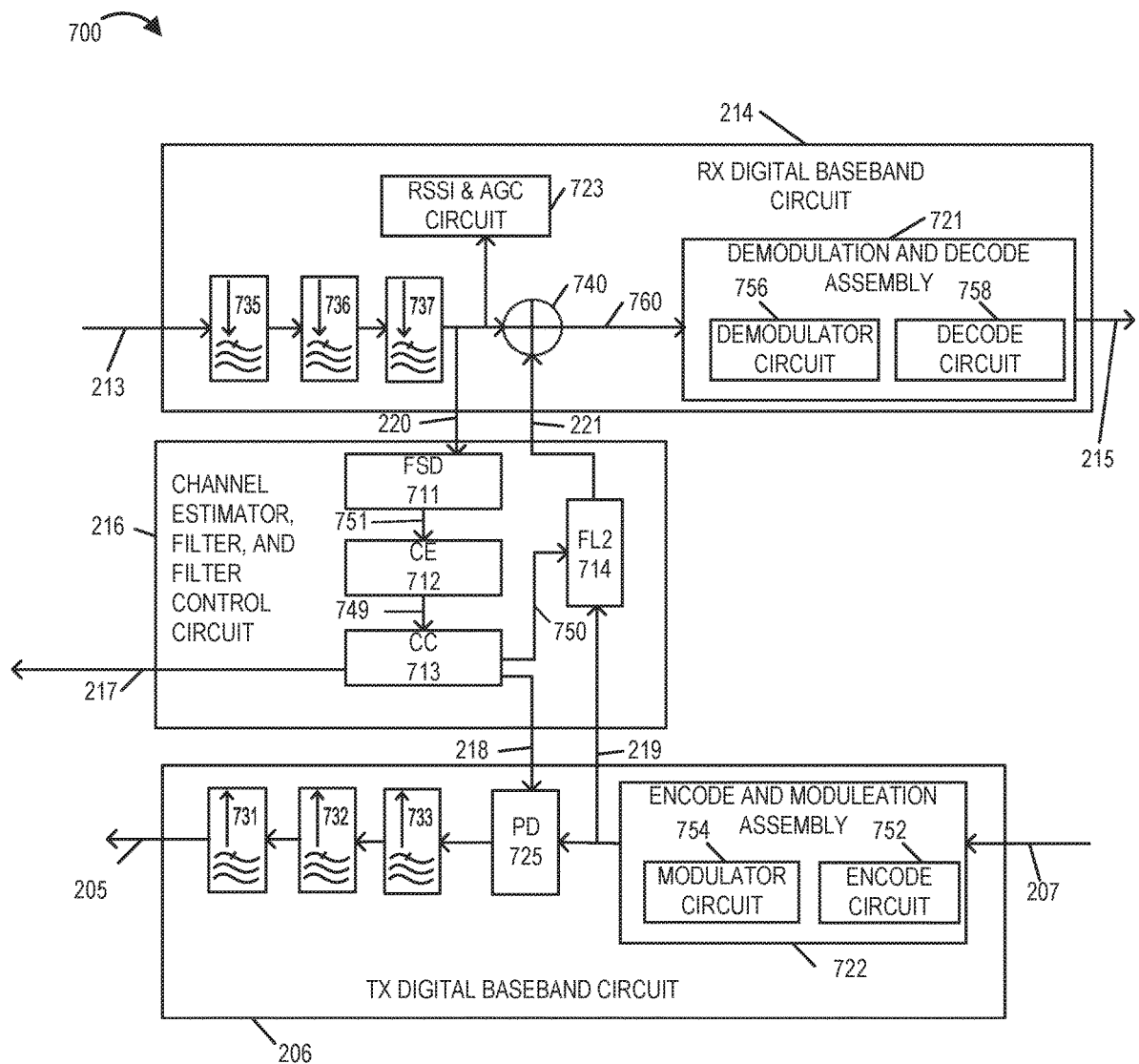
FIG. 7 shows at least some the components of an exemplary transceiver circuit in greater detail than is shown in the preceding figures.

FIG. 7 is a drawing 700 illustrating an exemplary RX digital baseband circuit 214, an exemplary TX digital baseband circuit 206 and an exemplary channel estimator, filter, e.g., digital filter, and filter control circuit 216 in further detail in accordance with an exemplary embodiment. FIG. 7 is used to describe digital control in an exemplary transceiver circuit, e.g., 102, 102' 102" or 102''', in accordance with an exemplary embodiment.

Channel estimator, filter and filter control circuit 216 includes a frame start detector (FSD) 711, a channel estimator (CE) 712 a coefficient calculator (CC) 713 and a FIR filter FL2 714 coupled together as shown in FIG. 7. TX digital baseband circuit 206 includes an encode and modulation assembly 722 including a modulator circuit 754 and a encode circuit 752, a pre distorter (PD) 725 and a plurality of up-converters (733, 732, 731) coupled together as shown in FIG. 7. RX digital baseband circuit 214 includes a plurality of down converters (735, 736, 737), a received signal strength indicator & automatic gain control (RSSI & AGC) circuit 723, a combiner 740, and a demodulation and decode assembly 721 including a demodulator circuit 756 and a decode circuit 758 coupled together as shown in FIG. 7.

The channel estimator, filter, e.g., digital cancellation filter, and filter control circuit 216 has two main inputs (220 and 219) from the digital blocks 214 and 206, respectively. Data in signal 207 is received by the encode and modulation assembly 722. The encode circuit 752 encodes received data, e.g., data bits, and the modulator circuit 754 modulates the encoded data generating signal 219. Signal 219 is a copy of the transmit signal in the digital domain that represents the sample waveform that undergoes up-conversion, e.g., by up converters 733, 732, 731, to an appropriate sampling rate and subsequent conversion in the analog domain. The signal copy 219 is filtered using an FIR filter realization 714 driven by the coefficients calculated by the coefficient calculator 713. The calculated coefficients represent the compensation of linear and non-linear components of the signal. The block 216 takes in input signal 220 which is the received sample signal at the digital baseband receive 214. The received signal 214 then goes through the frame start detection process in circuit 711 where through correlation, the start of the frame is found out. The accurate frame timing information and the samples are passed on to the channel estimator 712 in signal 751. The channel estimator 713 calculates the coefficient of channel between the digital transmitter and the digital receiver. Since the transmit signal is already known to the estimator, the channel estimator 712 uses that to calculate the channel behavior. The calculated channel behavior is then passed on to the channel coefficient calculator 713 in signal 749, and the channel coefficient calculator 713 derives the coefficient(s) for the RF interference cancellation filter, e.g., optical filter assembly 306 or 306', and digital filter 714. In some embodiments, the RF interference cancellation filter, e.g., optical filter assembly 306 or 306', is programmed at every milli-second time scale; however, the digital filter 714 is calibrated at every micro-second time scale. Coefficient calculator 713 generates and sends control signal 217 including calculated coefficient to the filter controller 310 or 310' of optical filter assembly 306 or 306'. Coefficient calculator generates and sends calculated coefficients in signal 750 to digital filter 714. The coefficient calculator 713 is responsible for making sure that the right coefficient is picked between the photonic filter 306 or 306' and digital interference canceller 714. The recreated self-interference signal 221 output from filter 714 is subtracted by combiner 740 from the processed incoming received signal 220, which is a downsampled version of incoming received signal 213. The output of combiner 740 is signal 760, which is an input to demodulation and decode assembly 721. Signal 760 is subjected to demodulation by demodulator circuit 756 and decoding by decode circuit 756 generating data out signal 215. The channel estimator, filter, and filter control circuit 216 also controls the pre distorter 725 in the digital baseband circuit 206 of the transmit chain. This pre-distorter 725 can, and does, shape the transmit signal such that it is easier to cancel on the receive side. This pre-distorter 725 is dynamically tunable and can, and does, adapt based on a change in the requirements.

Figure 8:
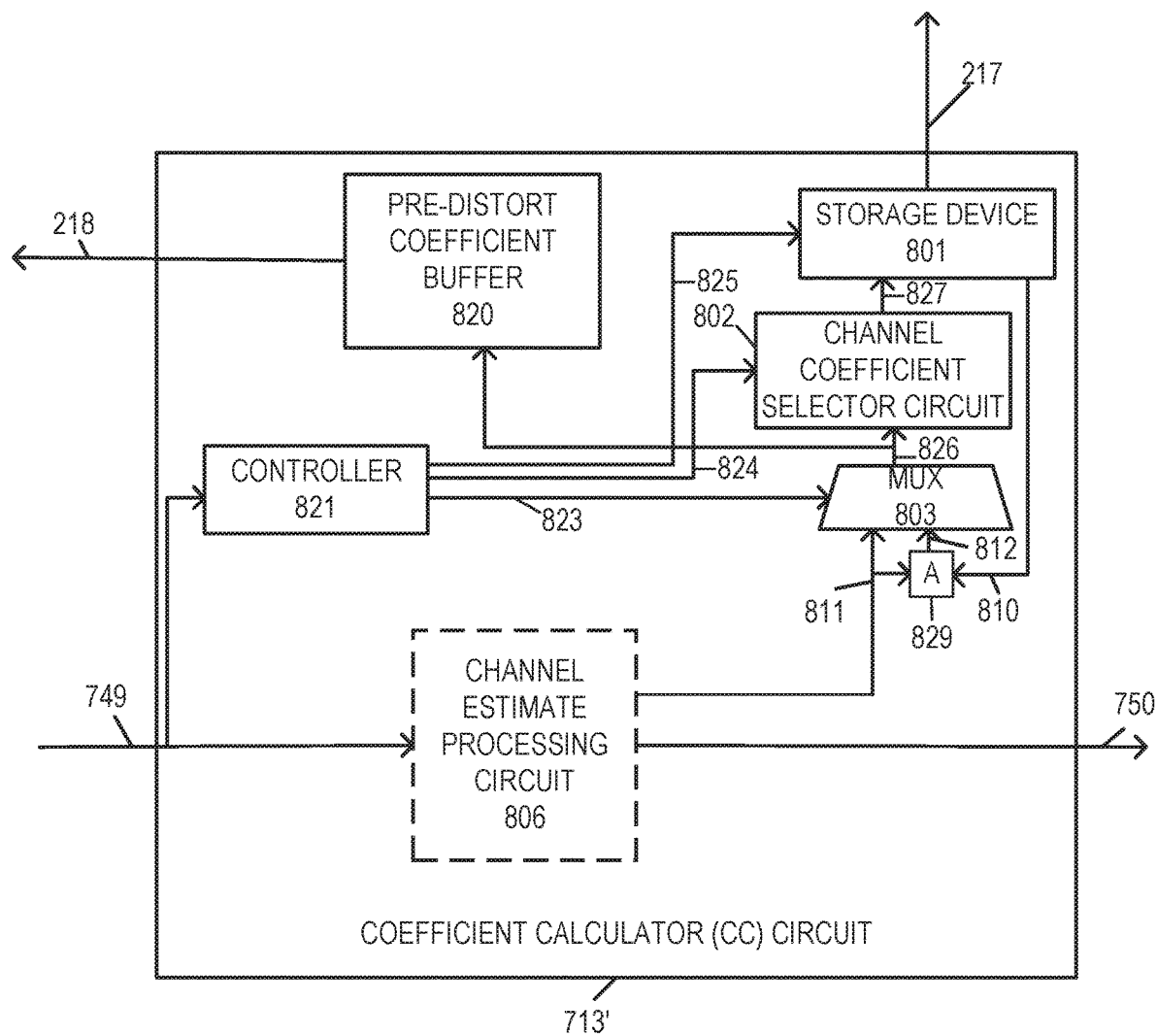
FIG. 8 shows an exemplary coefficient calculator circuit that can be used in various embodiments in accordance with the invention.

FIG. 8 is a drawing of an exemplary coefficient calculator circuit 713' in accordance with an exemplary embodiment. Exemplary coefficient calculator 713' is, e.g., coefficient calculator 713 of FIG. 7. The input to coefficient calculator 713' is channel estimates 749 and the outputs are coefficients 217, 218 and 750. The coefficients 218 are used in the pre-distorter 725 in the TX digital baseband circuit 206 of the digital transmit chain to pre-distort the digital transmit signal 219 for more efficient self-interference cancellation. The coefficients communicated in signal 217 are used to program/select the attenuation/gain and delay values of various branches and/or elements of the RF up-converter and cancellation filter circuit 222. The coefficients output in signal 750 are computed scalars programmed to the linear and non-linear filter 714. The input signal 749 received by the block 713' includes the channel estimates of the self-channel between the transmit and receive. Input signal 749 also includes system parameters computed by the frame start detect 711 and channel estimate block 712 such as the transmit and receive gain values, frame start timing etc. This input 749 is passed on to the channel estimates processing circuit 806 and the controller 821. The channel estimates processing circuit 806 is responsible for computation of coefficients 750 that are to be programmed into the digital filter 714. The channel estimate processing circuit 806 also calculates the coefficients 811 that correspond to the values for RF up-converter and cancellation filter 222. The multiplexer 803 can, and does, select between the computed coefficients 811 or the average of 811 and 810 through the averaging function device 829. The channel coefficient selector circuit 802 selects set of coefficients 827 that ultimately go to the storage device 827 and are subsequently sent to the RF up-converter and cancellation filter 222. The storage device 801 also keeps a copy of past programmed values. The outputs 810 and 217 from the storage device 801 can be selected using the select signal 825 from the controller 821. The controller 821 controls the storage device 801, channel coefficient selector 802, and multiplexer 803 through control signals (825, 824, 823), respectively. Signal 826 including coefficients, output from MUX 803 is input to the channel coefficient selector circuit 802 and input into the pre-distort coefficient buffer 820, from which the coefficients are communicated to the pre-distorter 725 in signal 218.

One or more of the Electro-Optic Active Filters described herein use optical delays and processing to enable filtering at radio frequencies. Such an architecture has multiple advantages for radio frequency filtering over systems, which generate an interference cancelation signal purely using electrical components. Some of the advantages include i) a relatively Frequency agnostic nature that allows, regardless of RF center frequency, filtering of the desired RF signal from the undesired signal; ii) support for wideband communications with, given a number of filter taps, the extent of interference cancellation depending on fractional bandwidth of the system, (f2−f1)/fc. Thus the higher the center frequency, the greater the worst-case cancellation for a given filter can be. Thus, optical interference cancellation architecture as presented here presents a much deeper extent of cancellation and range of possible interference frequencies that can be canceled than might be possible using only electrical components operating in a more limited RF frequency domain. Another advantage includes: iii) support of adaptive active filtering with the filter design allowing for both changes in delays and/or filter gain coefficients. Such gain and delay can be relatively simple to implement in the optical domain as compared to in the electrical RF domain where highly accurate linear phase shifters and/or varactors might be needed for control of electrical circuits. Furthermore introducing optical delays is substantially easier than electrical circuit delays, as optical delays can be induced through changes in index of refraction and other mechanisms for slowing light through a medium. Similarly, variable attenuation/amplitude change in light is a significantly easier process to implement than is the process to implement variable attenuation/amplitude changes in electrical signals in many cases. The methods and apparatus are well suited for use in a wide range of communications devices which communicate in an RF frequency band. In the present application the RF frequency band is to include frequencies from 0 to 500 GHZ. Optical frequencies are above the 500 GHZ frequency.

The interference techniques are well suited for devices which communicate using antennas as well as those which communicate using RF frequencies over other media such as wire cables. The interference cancelation techniques can be used with wireless communications devices and/or wired communications devices. In the case of wireless communications devices a variety of antenna configurations can be used with the interference cancelation apparatus and methods. For example a single shared antenna may be used for transmitting and receiving signals, separate transmit and receive antennas may be used and/or the communications device may use one or more MIMO (multiple in multiple out) antenna configurations. Wired communications system with which the interference cancelation techniques may be used include Ethernet, coax and/or other wired communications systems where the non-optical conductors, e.g., metal, wire conductors or RF waveguides are used to communicate signals.

Communications devices may be, e.g. mobile devices such as cell phones which may communize wirelessly to other user devices or base stations, fixed devices such as stationary base stations or a wide variety of other types of communications devices which communicate, e.g., send and/or receive, RF signals.

In various embodiments, by using one or more optical filters to generate an interference cancelation signal in the optical domain, and then using an optical to electrical converter to generate an analog RF interference cancelation signal from an optical interference cancelation signal one or more of the problems associated with electrical RF filter circuits can be avoided with regard to generation of an interference cancelation signal.

In various embodiments an analog, or optionally digital, RF signal to be transmitted is converted into an optical signal. The optical signal is then filtered using one or more optical filters of an optical filter assembly. Amplitude and/or gain of one or more optical filters of the optical filter assembly are controlled taking into consideration communications channel conditions. Different optical filters may and often are controlled to have different delays and/or gains. The optical filter assembly acts as and sometimes is a multi-tap filter. Different taps, e.g., parallel filters, in the optical filter assembly may be, and sometimes are, controlled to have different gains. Since the filters, e.g., taps, of the optical filter assembly are implemented in the optical domain they have several advantages over electrical filters. For example, they can be implemented without concern for radiating RF signals and interference to other components since the optical signals will not be picked up by RF signal components such as regular copper wires. Furthermore, optical filters can be implemented in a relatively small space and at a relatively low cost allowing for the use of optical filter assemblies with a relatively large number of filter taps as compared to electrical filter circuits. For example, in some embodiments the optical filter assembly used to generate an interference cancelation signal includes 20, 50, 60, 100 or even more parallel optical filters working as separate controllable filter taps in a relatively small space, e.g., inside the housing of a cell phone or other mobile communications device.

Various numbered device and method embodiments will now be described.

Device embodiment 1 is directed to a communications device (100) comprising: a radio frequency signal to optical signal converter (304 or 304') having a radio frequency input (399 or 399') configured to receive a radio frequency signal (223) to be communicated and an optical output (397 or 397') for outputting a first optical signal (328) generated from said radio frequency signal (223) to be communicated; an optical filter assembly (306 or 306') for filtering said first optical signal (328); and an optical to radio frequency converter (308 or 404) coupled to an output (395 or 395') of said optical filter assembly (306 or 306'), said optical to radio frequency converter (308 or 404) for generating a radio frequency interference cancelation signal (224) from a second optical signal (334 or 591) output by said optical filter assembly (306 or 306').

Device embodiment 2 is directed to the communications device (100) of embodiment 1, wherein said optical to radio frequency converter (404) is a balanced photodetector, and wherein said optical to radio frequency converter (404) generates said radio interference cancelation signal (224) from said second optical signal (591) and a third optical signal (592) output from said optical filter assembly (306').

Device embodiment 3, is directed to the communications device (100) of device embodiment 1, further comprising a signal combiner (209) for combining a received radio frequency signal (233) with the radio frequency interference cancellation signal (224) to produce a recovered received radio frequency signal (235).

Device embodiment 4 is directed to the communications device (100) of device embodiment 3, wherein said signal combiner (209) is configured to subtract the radio frequency interference cancelation signal (224) from the received radio frequency signal (233) to generate the recovered radio frequency signal (235).

Device embodiment 5, is directed to the communications device (100) of device embodiment 3, wherein the optical filter assembly (306 or 306') includes at least one of i) an optical infinite impulse response filter assembly (311 or 511) or ii) an optical finite impulse response (FIR) filter assembly (313 or 513).

Device embodiment 6, is directed to the communications device (100) of device embodiment 5, wherein the optical filter assembly (306 or 306') includes both the optical infinite impulse response filter assembly (311 or 511) and the optical finite impulse response filter assembly (313 or 513).

Device embodiment 7, is directed to the communications device (100) of device embodiment 5, wherein the optical filter assembly (306 or 306') includes at least an optical infinite impulse response filter assembly (311 or 511) which includes one or more optical infinite impulse response filters (312, 312', 312") or (1001,1002, 1003).

Device embodiment 6, is directed to the communications device (100) of device embodiment 8, wherein the optical infinite impulse response (IIR) filter assembly (311 or 511) includes at least a first optical IIR filter (312 or 1001) including a first fixed optical delay element (320 or 504) and a first gain control element (319 or 503).

Device embodiment 9, is directed to the communications device (100) of device embodiment 8, wherein the optical infinite impulse response (IIR) filter assembly (311 or 511) includes a plurality of additional optical IIR filters ((312', 312") or (1001, 1002, 1003)) each including a different fixed optical delay element ((320') or (504, 506, 508)) and a different controllable gain control element ((319') or (503, 505, 507)).

Device embodiment 10, is directed to the communications device (100) of device embodiment 9, further comprising: a filter controller (310 or 310') for supplying independent gain control signals ((336, 336', 336") or (551, 552, 553)) to each of the gain control elements ((319, 319', 319") or (503, 505, 507)) of the optical IIR filter assembly (311 or 511).

Device embodiment 11, is directed to the communications device (100) of device embodiment 5 wherein the optical filter assembly (306 or 306') includes the optical finite impulse response (FIR) filter assembly (313 or 513), said optical FIR filter assembly (313 or 513) including one or more optical FIR filters ((314, 314', 314") or ((1004, 1005, 1006, 1007, 1008, 1009)) each including at least a controllable delay ((322, 322', 322") or (516, 518, 520, 522, 524, 526).

Device embodiment 12, is directed to the communications device (100) of device embodiment 5, wherein the optical filter assembly (306 or 306') includes the optical finite impulse response (FIR) filter assembly (313 or 513), said optical FIR filter assembly (313 or 513) including one or more optical FIR filters ((314, 314', 314") or ((1004, 1005, 1006, 1007, 1008, 1009)) each having a fixed delay.

Device embodiment 13, is directed to the communications device (100) of device embodiment 11, wherein the optical FIR filter assembly (313 or 513) includes: a first optical FIR filter (314 or 1004) including a first controllable optical delay element (322 or 516); and an optical amplifier (324 or 528) with a first controllable gain; and a second optical FIR filter (314' or 1005) including a second controllable optical delay element (322' or 518); and a second optical amplifier (324' or 530) with a second controllable gain.

Device embodiment 14, is directed to the communications device (100) of device embodiment 13, wherein the optical filter assembly (306 or 306') further includes a filter controller (310 or 310') which controls the amount of delay implemented by the first and second controllable optical delay elements ((322 and 322') or (516 and 518) and the gain for the first and second optical amplifiers ((324, 324') or (528, 530)).

Device embodiment 15, is directed to the communications device (100) of device embodiment 14, wherein the first controllable delay element (322 or 516) is implemented as a first switch based optical delay, said switch based optical delay (600) including at least a first switch (604) for altering an optical path through the first switch based optical delay (600); and wherein the radio frequency signal is in the range of 0 to 500 GHz.

Method embodiment 16 is directed to an interference cancelation method for use in a communications device, the method comprising: operating a radio frequency signal to optical signal converter (304 or 304') having a radio frequency input (399 or 399') to receive a radio frequency signal (223) to be communicated and to generate there from a first optical signal (328); operating an optical filter assembly (306 or 306') to filter said first optical signal (328) to generate a second optical signal; and operating an optical to radio frequency converter (308 or 404) coupled to an output (395 or 395') of said optical filter assembly (306 or 306'), to generate a radio frequency interference cancelation signal (224) from the second optical signal output by said optical filter assembly (306 or 306').

Method embodiment 17 is directed to the method of embodiment 16, wherein the second optical signal is an optical interference cancelation signal; and wherein operating an optical to radio frequency converter (308 or 404) to generate a radio frequency interference cancelation signal (224) from the second optical signal output by said optical filter assembly (306 or 306') includes converting said optical interference cancelation signal into an analog electrical radio frequency interference cancelation signal.

Method embodiment 18 is directed to the method of embodiment 16, wherein said optical to radio frequency converter (404) is a balanced photodetector, and wherein operating an optical to radio frequency converter (308 or 404) to generate the radio frequency interference cancelation signal (224) includes generating said radio interference cancelation signal (224) from said second optical signal (591) and a third optical signal (592) output from said optical filter assembly (306').

Method embodiment 19 is directed to the method of embodiment 16, further comprising: operating a signal combiner (209) to combine said received radio frequency signal (233) with the radio frequency interference cancellation signal (224) to produce a recovered received radio frequency signal (235).

Method embodiment 20 is directed to the method of embodiment 16, wherein the received radio frequency signal and radio frequency interference cancellation signal are analog signals.

Method embodiment 21 is directed to the method of embodiment 19, wherein operating a signal combiner (209) to combine a received radio frequency signal (233) with the radio frequency interference cancellation signal (224) to produce a recovered received radio frequency signal (235)

includes operating said signal combiner (209) to subtract the radio frequency interference cancelation signal (224) from the received radio frequency signal (233) to generate the recovered radio frequency signal (235).

Method embodiment 22 is directed to the method of embodiment 21, wherein the optical filter assembly (306 or 306') includes at least one of i) an optical infinite impulse response filter assembly (311 or 511) or ii) an optical finite impulse response (FIR) filter assembly (313 or 513).

Method embodiment 23 is directed to the method of embodiment 22, wherein the optical filter assembly (306 or 306') includes both the optical infinite impulse response filter assembly (311 or 511) and the optical finite impulse response filter assembly (313 or 513).

Method embodiment 24 is directed to the method of embodiment 22, wherein the optical filter assembly (306 or 306') includes at least an optical infinite impulse response filter assembly (311 or 511) which includes one or more optical infinite impulse response filters (312, 312', 312") or (1001,1002, 1003).

Method embodiment 25 is directed to the method of embodiment 24, wherein the optical infinite impulse response (IIR) filter assembly (311 or 511) includes at least a first optical IIR filter (312 or 1001) including a first fixed optical delay element (320 or 504) and a first gain control element (319 or 503).

Method embodiment 26 is directed to the method of embodiment 25, wherein the optical infinite impulse response (IIR) filter assembly (311 or 511) includes a plurality of additional optical IIR filters ((312', 312") or (1001, 1002, 1003)) each including a different fixed optical delay element ((320') or (504, 506, 508)) and a different controllable gain control element ((319') or (503, 505, 507)).

Method embodiment 27 is directed to the method of embodiment 26, further comprising: operating a filter controller (310 or 310') to supply independent gain control signals ((336, 336', 336") or (551, 552, 553)) to each of the gain control elements ((319, 319', 319") or (503, 505, 507)) of the optical IIR filter assembly (311 or 511).

Method embodiment 28 is directed to the method of embodiment 22, wherein the optical filter assembly (306 or 306') includes the optical finite impulse response (FIR) filter assembly (313 or 513), said optical FIR filter assembly (313 or 513) including one or more optical FIR filters ((314, 314', 314") or ((1004, 1005, 1006, 1007, 1008, 1009)) each including at least a controllable delay ((322, 322', 322") or (516, 518, 520, 522, 524, 526)).

Method embodiment 29 is directed to the method of embodiment 22, wherein the optical filter assembly (306 or 306') includes the optical finite impulse response (FIR) filter assembly (313 or 513), said optical FIR filter assembly (313 or 513) including one or more optical FIR filters ((314, 314', 314") or ((1004, 1005, 1006, 1007, 1008, 1009)) each having a fixed delay.

Method embodiment 30 is directed to the method of embodiment 28, wherein the optical FIR filter assembly (313 or 513) includes a first optical FIR filter (314 or 1004) including a first controllable optical delay element (322 or 516) and an optical amplifier (324 or 528) with a first controllable gain; and a second optical FIR filter (314' or 1005) including a second controllable optical delay element (322' or 518) and a second optical amplifier (324' or 530) with a second controllable gain.

Method embodiment 31 is directed to the method of embodiment 30, wherein the optical filter assembly (306 or 306') further includes a filter controller (310 or 310') which controls the amount of delay implemented by the first and second controllable optical delay elements ((322 and 322') or (516 and 518) and the gain for the first and second optical amplifiers ((324, 324') or (528, 530)).

Method embodiment 32 is directed to the method of embodiment 31, wherein the first controllable delay element (322 or 516) is implemented as a first switch based optical delay device, the method further comprising controlling a position a first switch (604) in said first controllable delay element (322 or 516) to control an optical path through the first switch based optical delay device (600).

Method embodiment 33 is directed to the method of embodiment 32, wherein said radio frequency signal is in the range of 0 to 500 GHz (Giga hertz) and wherein the first optical signal is in a higher frequency range.

Computer readable medium embodiment 34 is directed to a computer readable medium, e.g., memory (106) including computer executable instructions, e.g., a communications device control routine (111), which when executed by a processor of the communications device (100), control the communications device (100) to perform the steps of operating a radio frequency signal to optical signal converter (304 or 304') having a radio frequency input (399 or 399') to receive a radio frequency signal (223) to be communicated and to generate therefrom a first optical signal (328); operating an optical filter assembly (306 or 306') to filter said first optical signal (328) to generated a second optical signal; and operating an optical to radio frequency converter (308 or 404) coupled to an output (395 or 395') of said optical filter assembly (306 or 306'), to generate a radio frequency interference cancelation signal (224) from the second optical signal output by said optical filter assembly (306 or 306').

It should be appreciated that since optical filter circuits do not suffer from the same thermal noise issues of electrical filter circuits, the optical filter assembly can be used in at least some embodiments to generate reliable interference cancelation signals with relatively low power at one or more frequencies where the power level might be below that of the thermal noise floor of electrical filter components which might be used in a filter.

The use of optical filters allows for multiple taps with different gains and/or delays to be used and controlled using optical gain and delay control techniques which are easily implemented using known optical techniques and which can allow for rapid changes in filter gain and/or delay values to reflect detected changes in channel conditions.

While numerous different features and examples are described all features need not be used in all embodiments. For example, in some embodiments fixed optical filter weights and delays are used, e.g., in the optical filter assemblies shown in FIGS. 3 and 5, while in other embodiments filter weights and delays are changed dynamically in response to detecting changes in channel conditions. Fixed gain and delay filter embodiments are well suited for static conditions where a device may be stationary and the communications channel does not change significantly over time while dynamic control of optical gains and delays is well suited for dynamic environments where channel conditions between a receiver and transmitter of a device are likely to change, e.g., due to device movement or changes in the environment.

In addition the use of optical filters allows for a dynamic range and linearity of the optical filter that can be significantly higher than that of RF systems which might be found in common commercial RF communications devices. Thus, the optical filter approach can avoid introducing significant new distortions into an RF signal that might be introduced by the use of electrical component based RF filters that may be less linear than desired and/or which may suffer from thermal noise and/or may generate RF interference inside a communications device.

The techniques of various embodiments may be implemented using software, hardware and/or a combination of software and hardware. Various embodiments are directed to communications devices including RF circuitry and optoelectronic circuitry. Various embodiments are directed to apparatus, e.g., communications devices, e.g., nodes such as mobile wireless terminals, base stations, and/or communications system. Various embodiments are also directed to methods, e.g., method of controlling and/or operating a communications device, e.g., a wireless terminals, base stations and/or communications systems. Various embodiments are also directed to non-transitory machine, e.g., computer, readable medium, e.g., ROM, RAM, CDs, hard discs, etc., which include machine-readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various embodiments, devices described herein are implemented using one or more modules to perform the steps corresponding to one or more methods, for example, signal generation, processing, receiving and/or transmitting steps. Thus, in some embodiments various features are implemented using modules. Such modules may be implemented using software, hardware or a combination of software and hardware. In some embodiments modules are implemented fully in hardware, e.g., as individual circuits. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple, or all of the steps of one or more methods of the invention.

In some embodiments, the processor or processors, e.g., CPUs, of one or more devices, e.g., communications devices such as wireless terminals (UEs), and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

The methods and apparatus of various embodiments are applicable to a wide range of communications systems including many cellular and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A radio frequency (RF) communications device comprising:
   a first antenna configured to transmit a first RF signal at a first carrier frequency;
   a second antenna configured to receive a second RF signal at a second carrier frequency;
   an RF-to-optical converter configured to:
      receive as input the first RF signal; and
      provide as output an optical output signal based on the first RF signal;
   an optical filter assembly configured to filter the optical output signal to generate a filtered optical signal;

an optical-to-RF converter configured to:
    receive as input the filtered optical signal; and
    provide as output a third RF signal based on the filtered optical signal; and
a signal combiner for combining the third RF signal and the second RF signal to generate a recovered received RF signal from the second RF signal.

2. The RF communications device of claim 1, wherein the first carrier frequency is different form the second carrier frequency.

3. The RF communications device of claim 1, the first RF signal is transmitted by the first antenna over a first wireless protocol and the second RF signal is received by the second antenna over a second wireless protocol.

4. The RF communications device of claim 3, wherein the first wireless protocol is different from the second wireless protocol.

5. The RF communications device of claim 1, wherein the first RF signal has a first bandwidth and the second RF signal has a second bandwidth.

6. The RF communications device of claim 5, wherein the first bandwidth at least partially overlaps the second bandwidth.

7. The RF communications device of claim 1, comprising:
a first radio comprising:
    the first antenna;
    the second antenna;
    the RF-to-optical converter;
    the optical filter assembly;
    the optical-to-RF converter; and
    the signal combiner; and
a second radio configured to transmit a fourth RF signal based at least in part on the second RF signal.

8. The RF communications device of claim 7, wherein the first radio is a full duplex radio.

9. The RF communications device of claim 7, wherein:
the second radio comprises a third antenna; and
the second radio is configured to generate the first RF signal at least in part in response to receiving a fifth RF signal from the third antenna.

10. An RF communications device comprising:
an antenna;
a signal generator configured to generate an RF transmit signal;
a circulator coupled to the antenna and defining:
    a first port coupled to the first antenna;
    a second port configured to receive as input the RF transmit signal to apply to the antenna via the first port;
    a third port configured to provide as output an RF receive signal received by the antenna;
an RF converter stage coupled to the signal generator and configured to:
    receive the RF transmit signal as input; and
    provide as output an RF cancellation signal configured to cancel the RF transmit signal in the RF domain; and
a signal combiner for combining the RF cancellation signal and the RF receive signal to generate a recovered received RF signal from the RF receive signal; wherein:
the RF receive signal is received as input to the signal generator; and
the RF transmit signal is based, at least in part, on the RF receive signal.

11. The RF communications device of claim 10, wherein the RF transmit signal is delayed with respect to the RF receive signal.

12. The RF communications device of claim 10, wherein:
the RF converter stage comprises at least one RF-to-optical converter, an optical filter assembly, and at least one optical-to-RF converter coupled in series; and
the optical filter assembly comprising at least one delay line.

13. The RF communications device of claim 12, wherein the RF converter stage comprises at least one RF filter.

14. An RF communications device comprising:
a first radio defining at least in part a first full duplex channel and configured to receive a first RF signal over the first full duplex channel and to transmit a second RF signal over the first full duplex channel; and
a second radio defining at least in part a second full duplex channel and configured to receive a third RF signal over the second full duplex channel and to transmit the first RF signal over the second full duplex channel, the second radio comprising:
an antenna configured to transmit the first RF signal over the second full duplex channel, thereby relaying the first RF signal from the first full duplex channel to the second full duplex channel;
a self-interference filter configured to:
    convert, to an optical signal, at least a portion of at least one of:
        the second RF signal as transmitted by the first radio; or
        the first RF signal as transmitted by the second radio;
    filter the optical signal with an optical filter to output a filtered optical signal; and
    convert the filter optical signal to a filtered RF signal; and
a RF combiner to merge the filtered RF signal with the third RF signal to generate a recovered received RF signal from the third RF signal.

15. The RF communications device of claim 14, wherein the first full duplex channel is associated with a first bandwidth that at least partially overlaps with a second bandwidth associated with the second full duplex channel.

16. The RF communications device of claim 14, wherein:
the antenna is a first antenna; and
the first radio comprises a second antenna coupled to a circulator, the second antenna configured to receive the first RF signal over the first full duplex channel and to transmit the second RF signal over the first full duplex channel.

17. The RF communications device of claim 14, wherein the RF communications device operates as a relay between the first full duplex channel and the second full duplex channel.

18. The RF communications device of claim 14, wherein the self-interference filter comprises at least one RF-domain self-interference filter.

19. The RF communications device of claim 14, wherein the optical filter comprises at least one at least one optical delay line.

* * * * *